US008233890B2

(12) United States Patent
Zellner et al.

(10) Patent No.: US 8,233,890 B2
(45) Date of Patent: *Jul. 31, 2012

(54) ENVIRONMENT INDEPENDENT USER PREFERENCE COMMUNICATION

(75) Inventors: Samuel N. Zellner, Dunwoody, GA (US); Douglas O'Neil, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 179 days.

This patent is subject to a terminal disclaimer.

(21) Appl. No.: 12/776,794

(22) Filed: May 10, 2010

(65) Prior Publication Data
US 2010/0223555 A1 Sep. 2, 2010

Related U.S. Application Data

(63) Continuation of application No. 11/366,154, filed on Mar. 2, 2006, now Pat. No. 7,747,246.

(51) Int. Cl.
*G06F 3/01* (2006.01)
*H04M 3/42* (2006.01)

(52) U.S. Cl. ............... 455/415; 340/573.1; 342/451; 348/731; 358/1.14; 370/349; 455/423; 455/432.3; 455/456.1; 455/556.2; 455/557; 705/34; 709/201; 709/220; 709/221; 709/227; 709/246; 715/733; 715/741; 715/815; 717/115

(58) Field of Classification Search .......... 358/1.14; 455/414.1, 415, 432.3, 456.1, 456.2, 456.3, 455/556.2, 557, 414.2, 418, 423; 705/34; 709/220, 227, 201, 221, 246; 717/115; 340/573.1; 342/451; 348/731; 370/349; 715/733, 741, 715/815

See application file for complete search history.

(56) References Cited

U.S. PATENT DOCUMENTS

| 5,461,390 | A | | 10/1995 | Hoshen |
| 5,502,757 | A | * | 3/1996 | Bales et al. ............ 455/414.1 |
| 5,742,905 | A | | 4/1998 | Pepe et al. |
| 6,134,314 | A | | 10/2000 | Dougherty et al. |
| 6,218,939 | B1 | | 4/2001 | Peper |
| 6,256,635 | B1 | * | 7/2001 | Arrouye et al. ............ 1/1 |
| 6,320,534 | B1 | | 11/2001 | Goss |
| 6,360,101 | B1 | | 3/2002 | Irvin |
| 6,400,956 | B1 | * | 6/2002 | Richton ............ 455/456.3 |
| 6,405,261 | B1 | | 6/2002 | Gaucher |
| 6,408,326 | B1 | * | 6/2002 | Larsson et al. ............ 709/201 |
| 6,459,969 | B1 | | 10/2002 | Bates et al. |
| 6,476,732 | B1 | | 11/2002 | Stephan |
| 6,477,374 | B1 | | 11/2002 | Shaffer et al. |
| 6,593,856 | B1 | | 7/2003 | Madau |
| 6,606,543 | B1 | | 8/2003 | Sproule et al. |

(Continued)

OTHER PUBLICATIONS

Zellner; U.S. Appl. No. 11/366,178, filed Mar. 2, 2006.

(Continued)

*Primary Examiner* — Gerald Gauthier
(74) *Attorney, Agent, or Firm* — Thomas, Kayden, Horstemeyer & Risley, LLP

(57) ABSTRACT

Included are embodiments of a method for communicating user preferences to at least one environment. At least one embodiment includes receiving a request from an environment for preference information related to a user and receiving a user identifier from the environment, the user identifier obtained via a portable user device. Other embodiments include determining at least one user preference related to the user, determining capabilities related to the environment, and communicating at least one user preference to the environment.

20 Claims, 35 Drawing Sheets

U.S. PATENT DOCUMENTS

| | | | |
|---|---|---|---|
| 6,650,902 B1 | 11/2003 | Richton | |
| 6,678,727 B1* | 1/2004 | Lee et al. | 709/221 |
| 6,748,225 B1* | 6/2004 | Kepler | 455/456.2 |
| 6,782,253 B1* | 8/2004 | Shteyn et al. | 455/414.1 |
| 7,010,306 B1* | 3/2006 | Tanibayashi et al. | 455/456.1 |
| 7,039,037 B2* | 5/2006 | Wang et al. | 370/349 |
| 7,050,798 B2* | 5/2006 | Ranta | 455/423 |
| 7,065,533 B2* | 6/2006 | Arrouye et al. | 717/115 |
| 7,162,237 B1 | 1/2007 | Silver et al. | |
| 7,245,258 B2* | 7/2007 | Velhal et al. | 342/451 |
| 7,319,876 B2* | 1/2008 | Jha et al. | 455/456.2 |
| 7,478,171 B2* | 1/2009 | Ramaswamy et al. | 709/246 |
| 7,532,884 B2* | 5/2009 | Silver et al. | 455/432.3 |
| 7,668,765 B2* | 2/2010 | Tanaka et al. | 705/34 |
| 7,747,246 B2* | 6/2010 | Zellner et al. | 455/415 |
| 7,813,741 B2* | 10/2010 | Hendrey et al. | 455/456.1 |
| 7,827,495 B2* | 11/2010 | Bells et al. | 715/744 |
| 2002/0055991 A1* | 5/2002 | Arrouye et al. | 709/220 |
| 2002/0111172 A1 | 8/2002 | DeWolf et al. | |
| 2002/0155844 A1* | 10/2002 | Rankin et al. | 455/456 |
| 2002/0164979 A1 | 11/2002 | Mooney et al. | |
| 2003/0001887 A1* | 1/2003 | Smith, IV | 345/741 |
| 2004/0036611 A1* | 2/2004 | Kidney et al. | 340/573.1 |
| 2004/0082326 A1 | 4/2004 | Shaw et al. | |
| 2004/0090121 A1 | 5/2004 | Simonds et al. | |
| 2004/0090346 A1 | 5/2004 | Simonds et al. | |
| 2004/0092253 A1 | 5/2004 | Simonds et al. | |
| 2004/0093154 A1 | 5/2004 | Simonds et al. | |
| 2004/0093155 A1 | 5/2004 | Simonds et al. | |
| 2004/0183714 A1 | 9/2004 | Yamashita et al. | |
| 2004/0235520 A1* | 11/2004 | Cadiz et al. | 455/557 |
| 2005/0050474 A1 | 3/2005 | Bells et al. | |
| 2005/0159823 A1 | 7/2005 | Hayes et al. | |
| 2005/0259290 A1* | 11/2005 | Tijerino et al. | 358/1.14 |
| 2006/0116116 A1* | 6/2006 | Slemmer et al. | 455/418 |
| 2006/0155854 A1* | 7/2006 | Selgert | 709/227 |
| 2006/0199610 A1* | 9/2006 | Dale | 455/556.2 |
| 2006/0200463 A1 | 9/2006 | Dettinger et al. | |
| 2006/0248557 A1 | 11/2006 | Stark et al. | |
| 2006/0262935 A1 | 11/2006 | Goose et al. | |
| 2007/0022075 A1 | 1/2007 | Horvitz et al. | |
| 2007/0050191 A1 | 3/2007 | Weider et al. | |
| 2007/0143482 A1 | 6/2007 | Zancho | |
| 2007/0197261 A1 | 8/2007 | Humbel | |
| 2007/0207789 A1* | 9/2007 | Zellner et al. | 455/415 |
| 2007/0208860 A1* | 9/2007 | Zellner et al. | 709/227 |
| 2007/0208861 A1* | 9/2007 | Zellner et al. | 709/227 |
| 2007/0259653 A1* | 11/2007 | Tang et al. | 455/414.2 |
| 2009/0186630 A1 | 7/2009 | Duff et al. | |
| 2010/0202346 A1 | 8/2010 | Sitzes et al. | |
| 2010/0223555 A1* | 9/2010 | Zellner et al. | 715/733 |
| 2010/0229226 A1 | 9/2010 | Yasrebi et al. | |
| 2010/0289633 A1 | 11/2010 | Aryal et al. | |
| 2011/0032102 A1 | 2/2011 | Miller et al. | |
| 2011/0157476 A1* | 6/2011 | Arling et al. | 348/731 |
| 2011/0169755 A1 | 7/2011 | Murphy et al. | |

OTHER PUBLICATIONS

Zellner; Non-Final Rejection mailed Oct. 23, 2008 for U.S. Appl. No. 11/366,178, filed Mar. 2, 2006.
Zellner; Non-Final Rejection mailed Oct. 7, 2009 for U.S. Appl. No. 11/366,178, filed Mar. 2, 2006.
Zellner; Final Office Action mailed Apr. 15, 2009 for U.S. Appl. No. 11/366,178, filed Mar. 2, 2006.
Zellner; Final Office Action mailed Apr. 14, 2010 for U.S. Appl. No. 11/366,178, filed Mar. 2, 2006.
Zellner; U.S. Appl. No. 11/366,177, filed Mar. 2, 2006.
Zellner; Non-Final Rejection mailed Oct. 7, 2008 for U.S. Appl. No. 11/366,177, filed Mar. 2, 2006.
Zellner; Non-Final Rejection mailed Oct. 5, 2009 for U.S. Appl. No. 11/366,177, filed Mar. 2, 2006.
Zellner; Final Office Action mailed Apr. 24, 2009 for U.S. Appl. No. 11/366,177, filed Mar. 2, 2006.
Zellner; Final Office Action mailed Apr. 14, 2010 for U.S. Appl. No. 11/366,177, filed Mar. 2, 2006.
Zellner; U.S. Appl. No. 11/366,154, filed Mar. 2, 2006.
Zellner; Notice of Allowance mailed Apr. 29, 2010 for U.S. Appl. No. 11/366,154, filed Mar. 2, 2006.
Zellner; Notice of Allowance mailed Apr. 2, 2010 for U.S. Appl. No. 11/366,154, filed Mar. 2, 2006.
Zellner; Non-Final Rejection mailed Oct. 5, 2009 for U.S. Appl. No. 11/366,154, filed Mar. 2, 2006.
"Parcel Post" printed from http://www.carolinaline.com/2005/06/can-it-convert-answer-to-cubits-please.html on Jul. 6, 2005; 2 pages.
"Construction Features" printed from http://www.usnews.com/usnews/tech/billgate/gatesco.htm on Jul. 6, 2005; 1 page.
"Bill Gates the entrepreneur of the century" printed from http://www.angelfire.com/ct/clism6/start.html on Jul. 6, 2005; 8 pages.
Zellner; Non-Final Office Action mailed Feb. 1, 2012 for U.S. Appl. No. 11/366,177, filed Mar. 2, 2006.
Zellner; Non-Final Office Action mailed Feb. 13, 2012 for U.S. Appl. No. 11/366,178, filed Mar. 2, 2006.

* cited by examiner

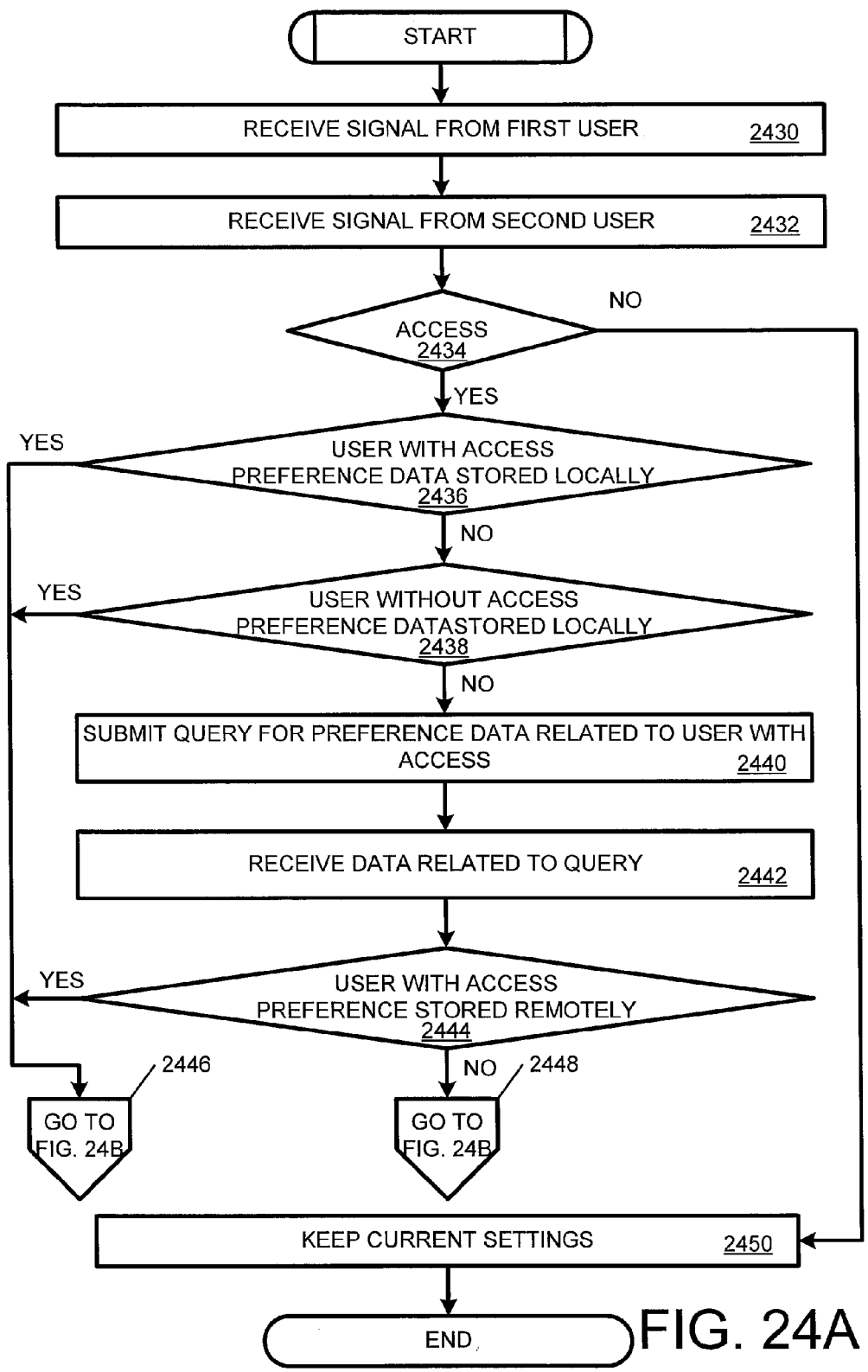

ENVIRONMENT INDEPENDENT USER PREFERENCE COMMUNICATION

CROSS REFERENCE

This application is a continuation of copending U.S. utility application entitled, "Environment Independent User Preference Communication," having Ser. No. 11/366,154, filed Mar. 2, 2006, which is related to copending U.S. Utility Patent Application entitled "User Specific Data Collection" having Ser. No. 11/366,177, filed Mar. 2, 2006, which is also related to copending U.S. Utility Patent Application entitled "User Preference Interpretation" having Ser. No. 11/366,178, filed Mar. 2, 2006, which are each hereby incorporated by reference in their entireties.

BACKGROUND

With many scenarios a user may access an environment, such as an automobile, and based on a user selection, the environment can adapt certain settings accordingly. As a non-limiting example, in many current automobiles, a user can select a "preset" button, which can return various settings, such as seat position to a preconfigured setting. Additionally, many automobiles also permit access to the automobile via a device, such as a fob or remote entry device, which can unlock doors, open the trunk, and potentially start the automobile's ignition.

While these features can provide users of an environment with customization, this customization is often limited in functionality. Additionally, while the automobile may recognize a fob or the selection of a "preset" button, the automobile generally does not recognize one user from any other user (i.e., the automobile does not know who pressed the "preset" button). Further, this customization is generally only environment specific, as other automobiles are generally unaware of these settings. Additionally, the customization functionality currently employed is generally limited to automobiles, as other environments, such as houses, hotels, retail establishments, etc. generally do not have customization features.

Thus, a heretofore unaddressed need exists in the industry to address the aforementioned deficiencies and inadequacies.

SUMMARY

Included are systems and methods for communicating user preferences to at least one environment. At least one embodiment of a method includes receiving a request from an environment for preference information related to a user, receiving a user identifier from the environment, the user identifier obtained via a portable user device, and determining at least one user preference related to the user. Other embodiments include determining capabilities related to the environment and communicating at least one user preference to the environment.

Also included are embodiments of a computer readable medium for setting user preferences in an environment. At least one embodiment of the computer readable medium includes logic configured to receive a first user identifier via a portable user device and logic configured to utilize the first user identifier to determine the identity of a first user. Some embodiments also include logic configured to communicate with a remote provisioning system to receive at least one user preference. Still other embodiments include logic configured to adapt the at least one user preference into at least one setting in the environment.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 24A is a flowchart illustrating exemplary steps that can be taken by an environment in determining, from a plurality of users, customized settings to employ, similar to the flowchart from FIG. 20.

DETAILED DESCRIPTION

Figure 1A:
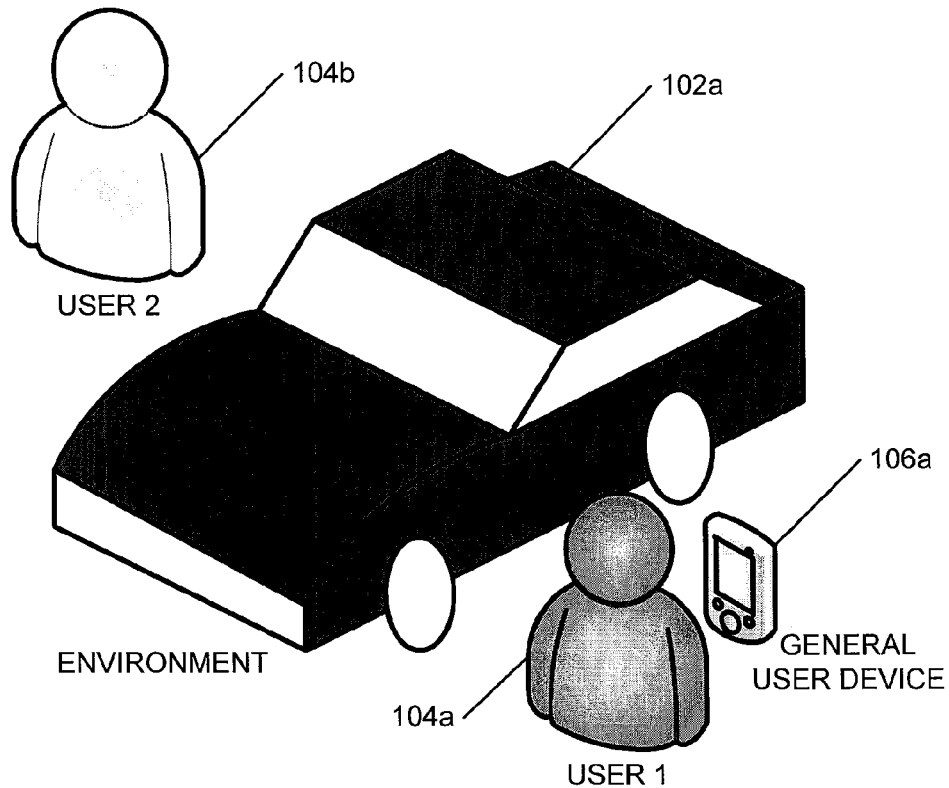
FIG. 1A is an exemplary perspective diagram illustrating a first user's access to a first automobile via a user device.

This disclosure includes embodiments of systems and methods that can store user preferences at a remote location for use in any of a plurality of environments. A user can carry a device having identifying information such as a cellular telephone, PDA, fob, etc. When the user approaches an environment (such as the user's car, a rental car, hotel room, house, etc.), the environment can receive a signal from the device and can determine whether the user is recognized. If not, the environment can communicate with a remote provisioning system or other remote component that is configured to identify the user and download the user's preferences to the environment. The communication between the environment and the remote provisioning system can be facilitated via a Uniform Resource Locator (URL), or other gateway for communicating information. Responsive to receiving the user preferences, the environment can adapt to match the received data.

Additional embodiments can include a system configured to collect and store user data, based on actions taken in the proximity of an environment. At least one embodiment might include an environment configured to determine the identity of a user and communicate the user's actions with a remote component. The remote component can log this data to determine insurance premiums, etc. (e.g., The user can make an agreement with an automobile insurance company that allows the insurance company to monitor the users seatbelt use in exchange for reduced insurance premiums). The system can record information related to the user, regardless of the environment.

Still other embodiments include a system and/or method configured to receive user preferences and interpret these preferences to provide a comfortable environment for the user. In at least one embodiment, the system can store at least two of three distinct types of preference information. The three types are device-specific, device-independent, and interpreted. The system can access the user's preferences, and from that information interpret potential user settings for a particular environment. This can be implemented in at least two ways, as discussed below.

First, a user can select user preferences in an environment (such as radio stations, seat position, interior/exterior color, temperature for an automobile, etc.). This selection can occur within the environment or via a website communication. From this information, the system can assign a "category" that is specific to that user (e.g., the system may determine that the user likes a "quiet" environment—when the user enters another environment, the system can automatically reduce volume, change color schemes, etc. to match that category).

Second, a user can simply communicate that a user desires a certain type of environment, to which the system can apply to various environments (e.g., the user accesses a website and inputs information indicating that the user enjoys a "conservative" environment—the system can then configure environments to match that category).

FIG. 1A is an exemplary perspective diagram illustrating a first user's access to a first automobile via a user device. More specifically, the nonlimiting example of FIG. 1A illustrates an environment 102a that takes the form of an automobile. A first user 104a and a second user 104b can access the automobile via general user device 106a. As discussed above, while general user device 106a can be configured to unlock doors, open the trunk, and potentially start the automobile 102a, general user device 106a generally has little capability related to recognizing the first user from the second user.

Figure 1B:
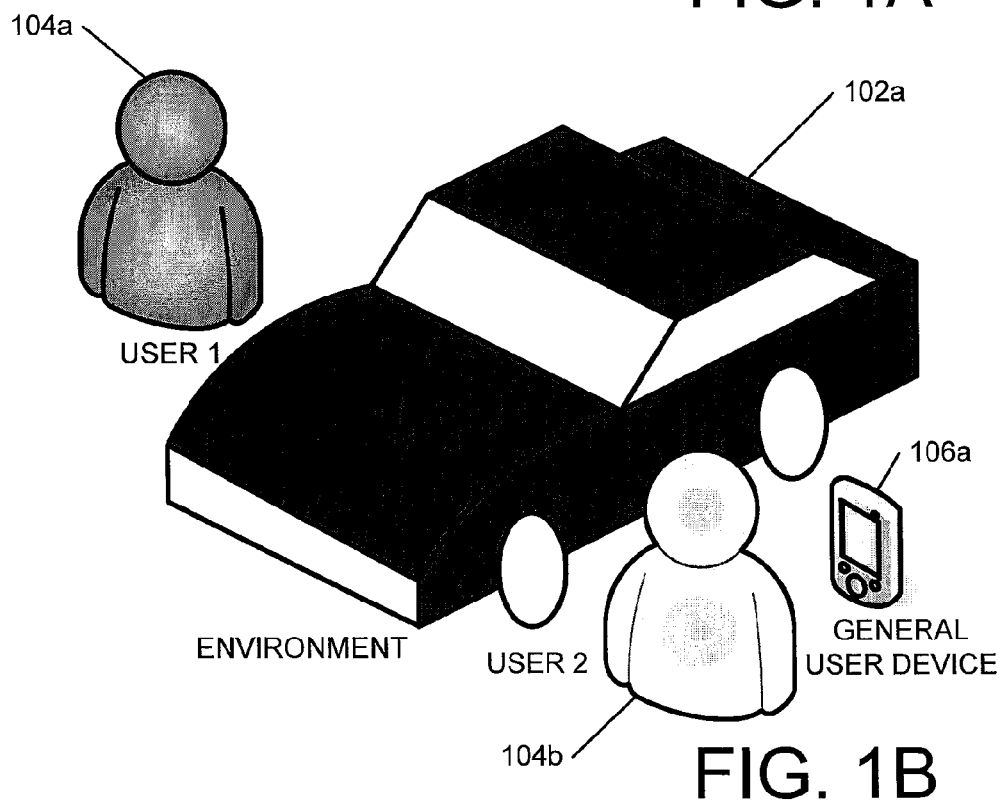
FIG. 1B is an exemplary perspective diagram illustrating a second user's access to the first automobile of FIG. 1A.

FIG. 1B is an exemplary perspective diagram illustrating a second user's access to the first automobile of FIG. 1A. In this nonlimiting example, the first user 104*a* is a passenger of the automobile 102*a*, while second user 104*b* is the driver of the automobile 102*a* and has control of the general user device 106*a*. As indicated above, general user device 106*a* is not generally configured to determine that second user 104*b* (as opposed to first user 104*a*) is now the driver of the automobile 102*a*. As such, customization of the environment can be limited.

Figure 1C:
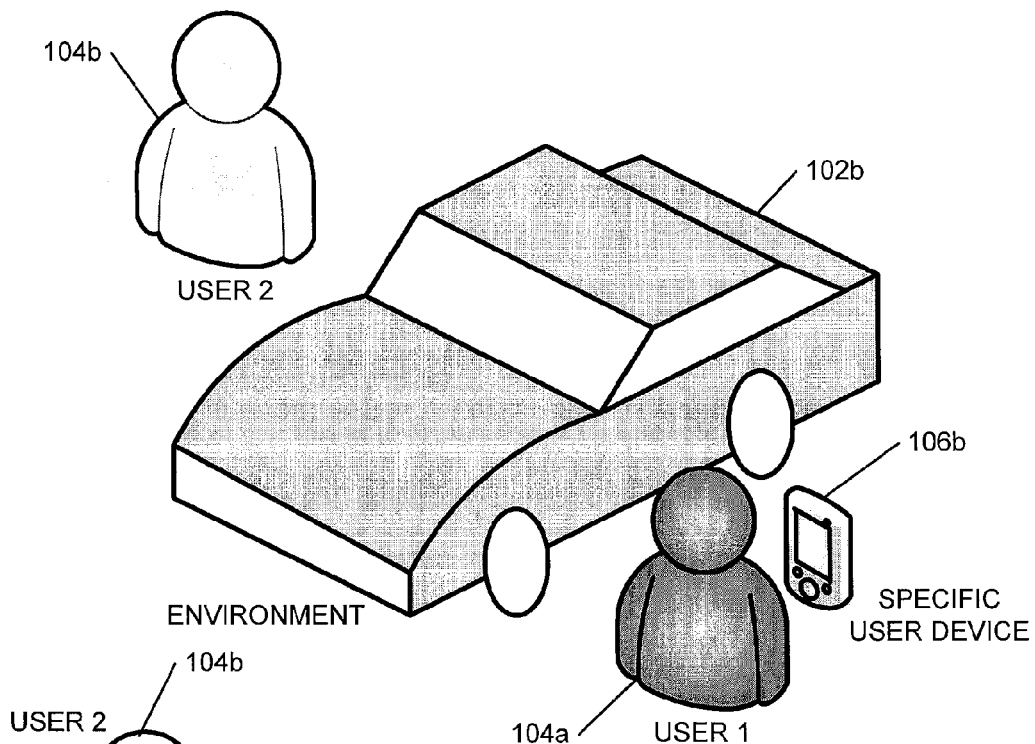
FIG. 1C is an exemplary perspective diagram illustrating a second user's access to a second automobile, similar to the diagram of FIG. 1A.

FIG. 1C is an exemplary perspective diagram illustrating a second user's access to a second automobile using a specific user device, similar to the diagram of FIG. 1A. More specifically, the nonlimiting example of FIG. 1C illustrates that environment 102*b*, which, in this nonlimiting example, is an automobile configured to determine a user's identity from a specific user device. In such a configuration, the automobile 102*b* can be configured to receive a signal from the specific user device 106*b*. The specific user device 106 has information identifying the user 104*a* (e.g., a USERID, contact information, preference data, etc.). The signal can be received via an explicit user command, however this is not a requirement. In at least one embodiment, the user specific device 106*b* can be configured to continuously send or repeatedly send a signal without user input. In either event, the environment 102*b* can be configured to receive the signal from the user specific device and determine the user's identity.

Figure 1D:
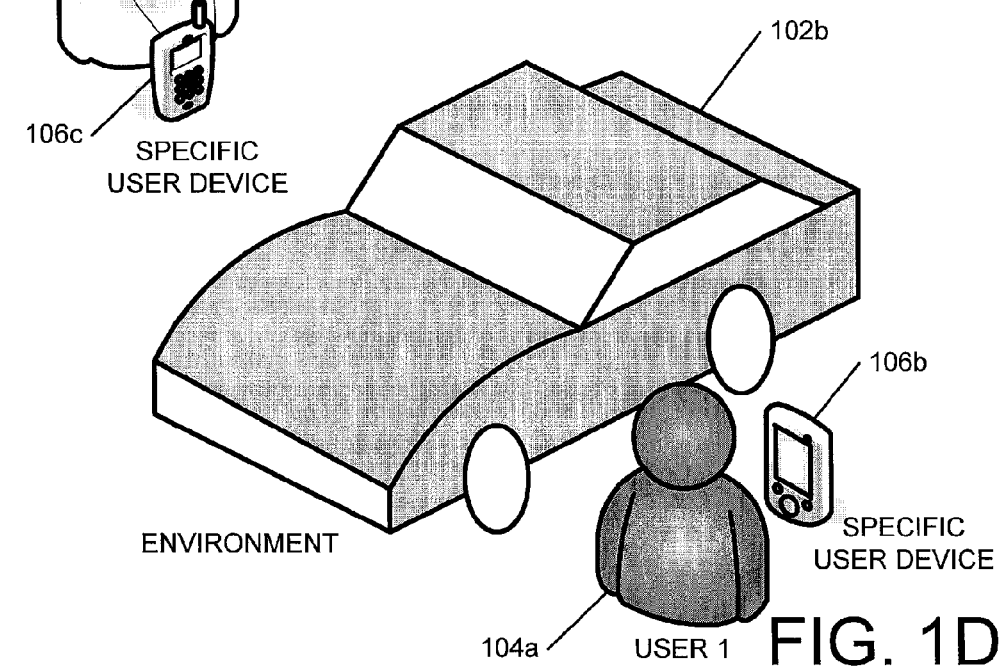
FIG. 1D is an exemplary perspective diagram illustrating recognition of a first user and a second user by the automobile from FIG. 1C.

FIG. 1D is an exemplary perspective diagram illustrating recognition of a first user and a second user by the automobile from FIG. 1C. More specifically, in this nonlimiting example, the second user 104*b* is carrying a specific user device 106*c* that takes the form of a cellular telephone. The specific user device 106*c* has information identifying the user 104*b* (e.g., a USERID, contact information, preference data, etc.). In this exemplary embodiment, the environment 102*b* can be configured to receive a signal from the specific user device 106*c* (cellular telephone) to facilitate a determination of the second user's identity, in addition to determining the first user's identity via a signal from the specific user device 106*b*. One should note that, depending on the particular configuration, the second user (or the first user) need not be otherwise associated with the environment 102*b*. More specifically, the second user need not have ever entered the environment 102*b* for the environment 102*b* to determine the second user's identity.

Additionally, in at least one embodiment, the environment 102*b* can be configured to determine each user's position in the environment. More specifically, in at least one embodiment, the environment 102*b* can be configured to determine that first user 104*a* is the driver and that second user 104*b* is the passenger (and in which seat the second user is sitting). Additionally, the environment can be configured to determine which user has access to the environment (i.e., which user has the ability to unlock the car doors, deactivate the alarm, and/or start the ignition, etc.).

One should also note that while specific user device 106*b* takes the form of a keyless entry system remote (similar to element 106*b*) and specific device 106*c* takes the form of a cellular telephone, these are nonlimiting examples. Depending on the particular configuration, the specific user device can take the form of any device that can be configured to send a user identifier to an environment. While some configurations may be configured to implement this functionality into an existing device such as a cellular telephone or keyless entry remote, other configurations may be configured to provide a separate device configured to send a user identifier to the environment. Additionally, one should note that in at least one configuration, determination of user identity can be separate from gaining access to the environment 102*b*. More specifically, the environment can determine a user's identity without providing that user access to the environment. Other embodiments can be configured to provide access to the environment with the user identification process.

Figure 2:
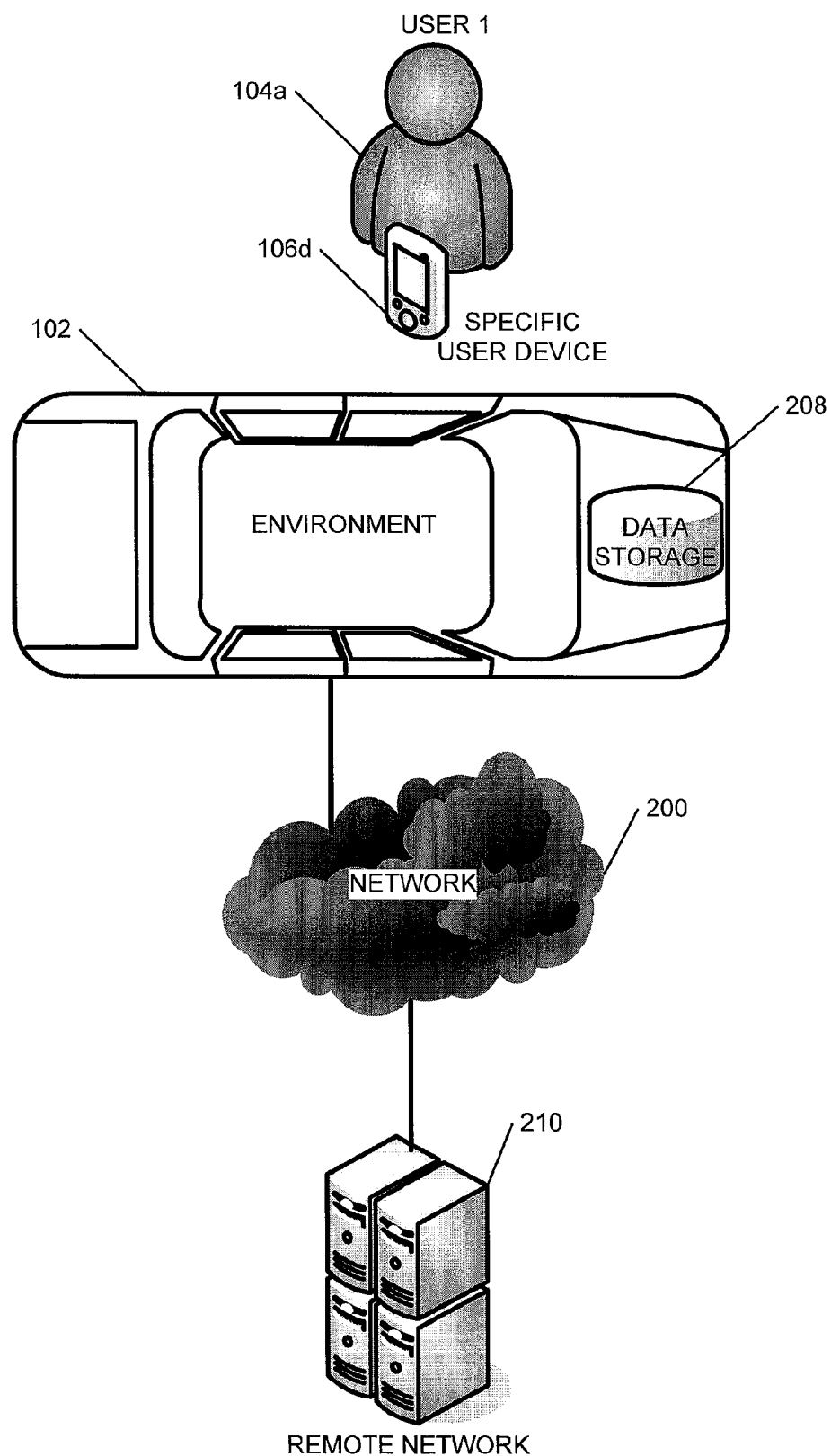
FIG. 2 is an exemplary network diagram illustrating various components that may be implemented in providing the recognition and customization functionality from FIG. 1D.

FIG. 2 is an exemplary network diagram illustrating various components that may be implemented in providing the recognition and customization functionality from FIG. 1D. More specifically, in the nonlimiting example of FIG. 2, the environment can be coupled (physically, communicatively, or both) to a communications network 200. The communications network 200 can include a wide area network, such as the Internet, however this is not a requirement. The communications network 200 can also be coupled to a remote network 210. While the term "remote network" is used in this particular nonlimiting example, as one of ordinary skill in the art will understand, element 210 need not be limited to a network. More specifically, in at least one embodiment, a server or other computing device can serve the purposes of the remote network.

In operation, the environment 102 can be configured to receive a user identifier from the first user 104*a* via specific device 106*d*, as discussed above. The user identifier can take the form of a signal that includes user specific data for identifying the particular user. Upon receiving the user identifier, the environment can be configured to access environment data storage 208 to determine the first user's identity. If the first user's identity is not stored at the environment, the environment can be configured to send data related to the user identifier to remote network 210, which can include a remote provisioning system (not shown), via communications network 200. Remote network 210 can be configured to determine the user's identity and send at least one user preference to the environment 102.

Alternatively, if the environment determines that the user's identity is stored locally, the environment 102 can determine whether the user's preferences are also stored locally. If the user's preferences are stored locally, the environment 120 can be configured to adapt at least one setting in the environment to match the user's preferences. If the environment determines that the user's preferences are not stored locally, the environment 102 can send a preference request to remote network 210 to determine the desired preference data.

While this disclosure refers to the environment performing one or more functions, as one of ordinary skill in the art will understand, at least one embodiment of an environment can be coupled to a computing device to perform these functions. More specifically, as described with reference to FIG. 5, the environment 102 may include data storage (such as data storage 208), a processor, a memory, etc. to facilitate this functionality.

One should also note, that depending on the particular configuration, the user device 106 (which may take the form of a specific user device, general user device, etc.) may also be configured to store preference data related to the user. More specifically, in at least one embodiment, the user device 106 can be configured to receive user preference data (directly from the user, via a network, and/or via other ways) and send at least a portion of the user preference data to a desired environment. The environment may be configured to determine when preference data received from the user device 106 is utilized.

Figure 3:
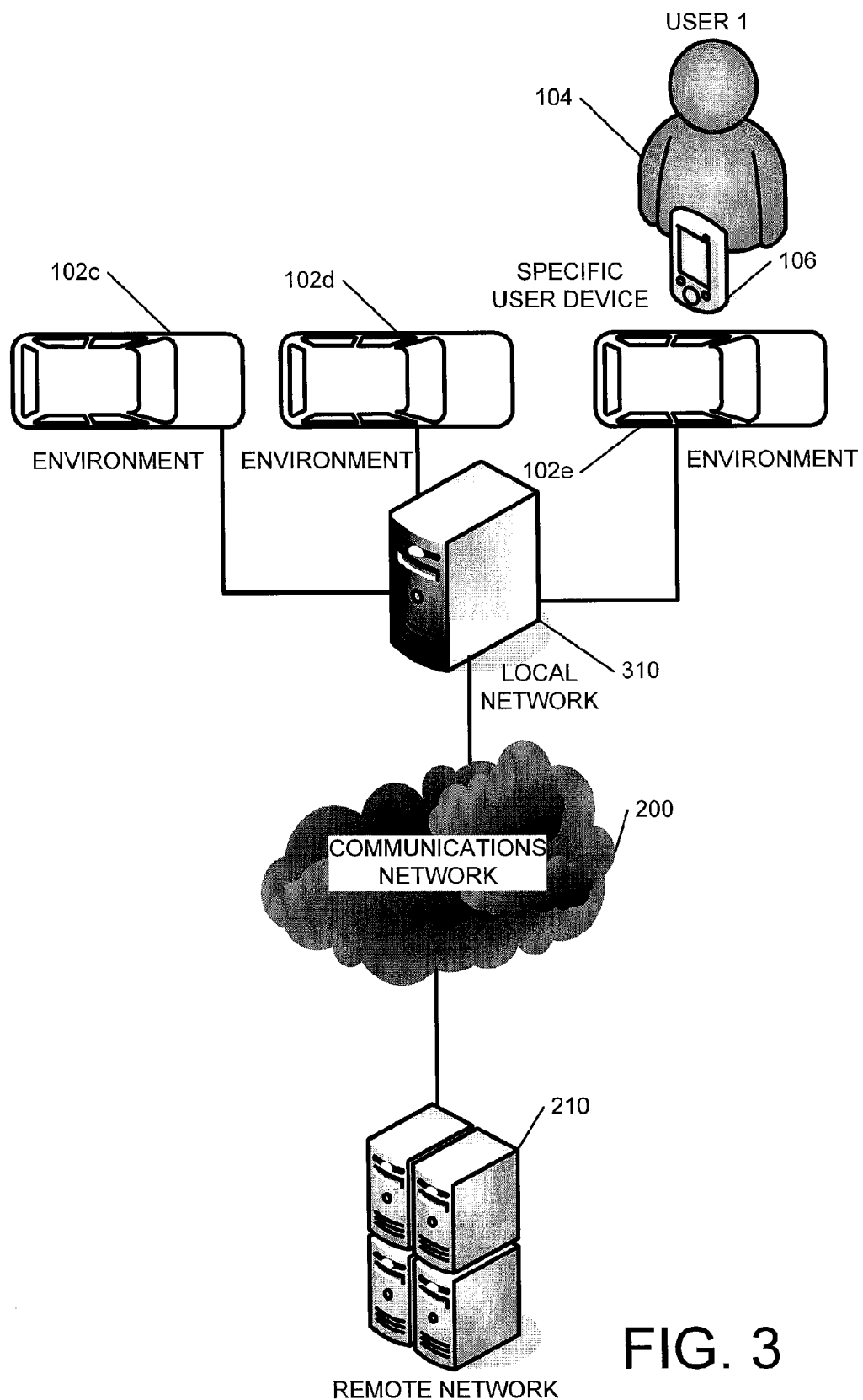
FIG. 3 is an exemplary network diagram illustrating various components that may be implemented in providing local recognition and customization, similar to the network diagram from FIG. 2.

FIG. 3 is an exemplary network diagram illustrating various components that may be implemented in providing local recognition and customization, similar to the network diagram from FIG. 2. More specifically, as illustrated in the nonlimiting example of FIG. 3, environments 102c, 102d, and 102e are coupled to local network 310. Local network 310 is also coupled to communications network 200, which is coupled to remote network 210 (which can include a remote provisioning system).

In operation, a user 104 with specific user device 106 can send a user identifier to environment 102e. The environment 102e can be configured to determine whether the user's identity is stored at environment 102e. If this data is not stored at environment 102e, the environment 102e can send data related to the user identifier to local network 310a. Local network 310 can be configured to determine if the user's identity is stored at local network 310 (or a local data storage or both). If the user's identity is not stored at local network 310, the local network can send data related to the user's identity to remote network 210. The remote network 210 can determine if the requested data is stored at remote network (including remote data storage). If so, the user's identity can be sent back to local network 310. Similar steps can be taken to determine the user's preference data.

One should note that while the above description indicates that each environment can store user identity and/or user preference data at the environment, this is a nonlimiting example. In at least one configuration, the local network 310 can be implemented to reduce amount of logic in any one environment. Such a configuration may be desirable for an automobile rental business that includes a fleet of automobiles. Costs may be reduced by reducing the logic in each environment. Additionally, with reference to the automobile rental business example, a user can rent an automobile. The automobile rental business can be configured to give the user keys, a remote access device, etc. for accessing the automobile. Additionally, the automobile can be configured to receive, from the specific user device 106, a user identifier associated with that user. The environment 102e can then send the received user identifier to a local network 310 associated with the automobile rental business.

Based on records maintained by the automobile rental business, a determination can be made as to whether the user's identity and/or preference data is stored on the local network 310. If so, the data can be sent to the environment 102e. If the identity and/or preference data is not stored at the local network, the local network can send a query to the remote network 210 for the desired data. Upon receiving the user's information, the environment can temporarily (or permanently, depending on the configuration) store the user's identity and/or preference data for quicker access.

Additionally, in at least one nonlimiting example, the local network 310 can query the remote network 210 regardless of whether the user's preference data is stored at the local network 310. More specifically, the local network 310 can be configured to query the remote network 210 for updates to the user's preference information, as well as other information that may be inconsistent between the local network 310 and the remote network 210.

One should also note that while the configuration of FIG. 3 is discussed with reference to an automobile rental business, such a configuration can be utilized in any of a plurality of different scenarios. More specifically, as a nonlimiting example, such a configuration can be utilized in a hotel, where each room is a separate environment. This configuration can also be utilized at a home, at a car sales business, at a hotel, etc.

Figure 4:
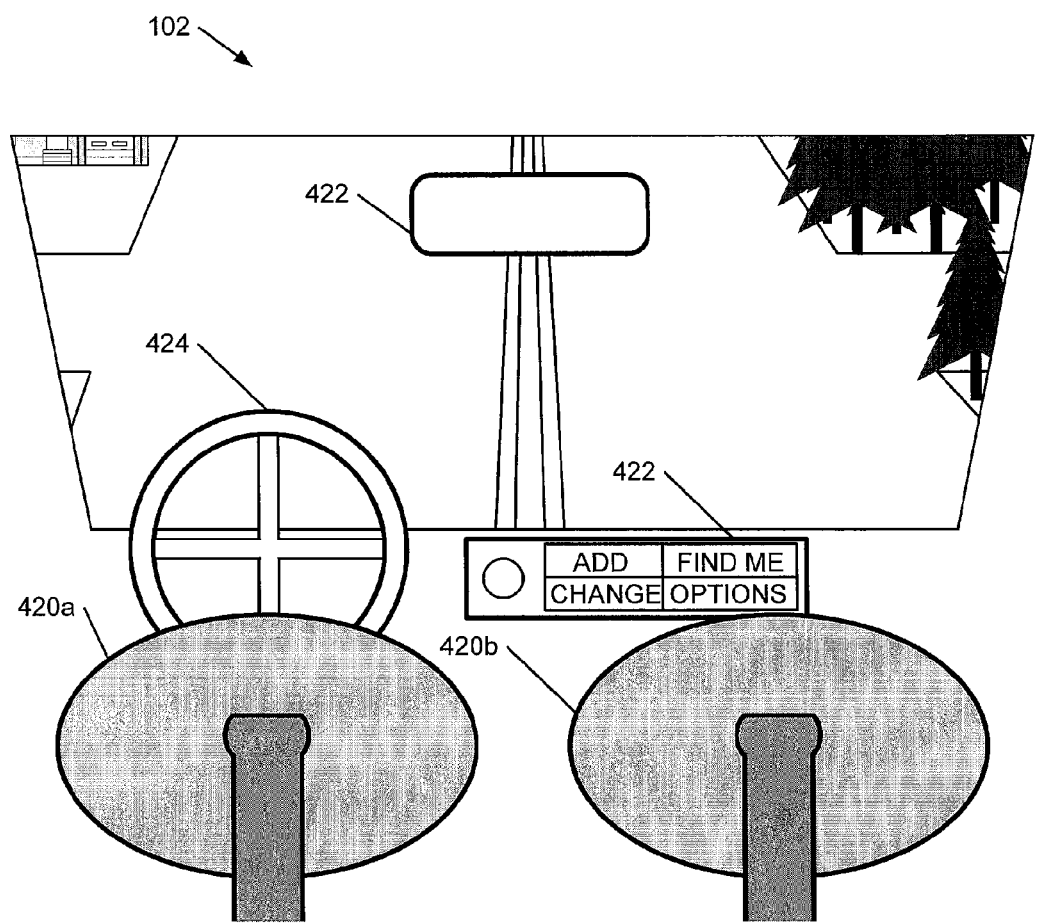
FIG. 4 is an exemplary perspective diagram illustrating components that can be present for providing recognition and customization in an environment, such as the automobile from FIG. 2.

FIG. 4 is an exemplary perspective diagram illustrating components that can be present for providing recognition and customization in an environment, such as the automobile from FIG. 2. More specifically, after gaining access to the automobile 102, the user can configure any of a plurality of settings according to the user's preferences. More specifically, the driver may desire to change the seat position of the driver's seat 420a, the position of steering wheel 424, the position of rear view mirror 422, the radio stations (and/or other media such as playlists, CDs, movies, television programs, etc.), side view mirrors, temperature, etc. At least one embodiment of the environment can be configured to record the user's preferences related to one or more settings. The environment can store this data locally and/or send at least a portion of this data to remote network 210 (and/or local network 310). Once the user's preferences are sent to the remote network 210, any environment communicatively coupled to the remote network can, upon determining the user's identity, receive the stored user preferences, and configure at least one setting according to those preferences.

Additionally included in the nonlimiting embodiment of environment 102 is a user preference device 422, which can be configured to facilitate the storage and/or retrieval of user preferences. More specifically, if the environment does not automatically recognize a user, the user can select the "find me" option. By selecting the "find me" option, the environment can determine the user's identifier (from the specific user device 106) and proceed to determining the user's preferences.

Additionally, a user may change a setting in an environment, but desire that change to be a temporary change. In such a scenario, the user may desire to configure the environment such that a change is sent to the remote network 210 only after a selection of the "change" option. Similarly, the "add" option can provide the user with the ability to add a user preference to a setting not previously configured. The "options" option can provide the user with additional options.

Figure 5:
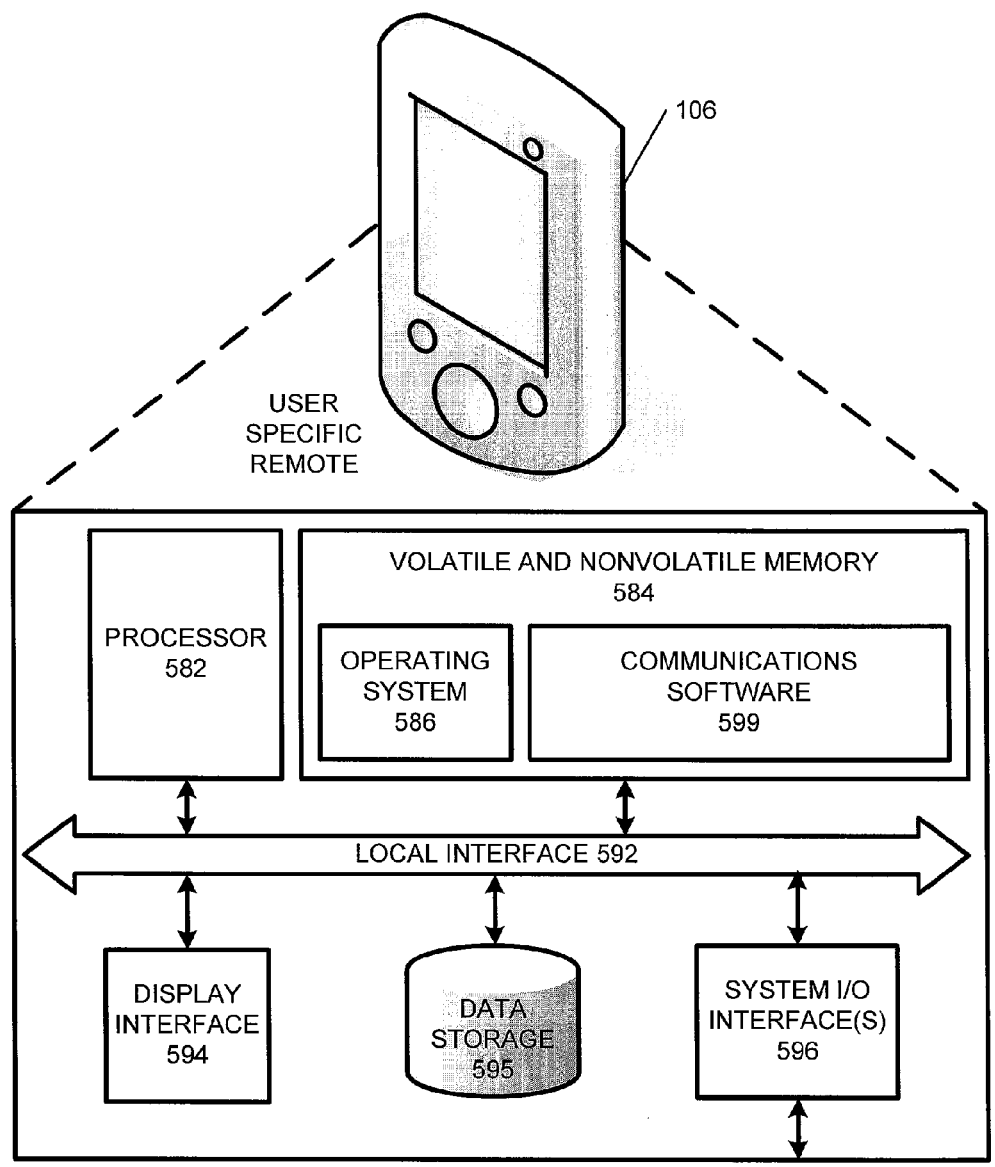
FIG. 5 is an exemplary block diagram illustrating various components that may be present in the user device from FIGS. 2 and 3.

FIG. 5 is an exemplary block diagram illustrating various components that may be present in the specific user device from FIGS. 2 and 3. Although the specific user device with keyless entry remote 106b is illustrated, this discussion can be applied to any specific user device including, but not limited to a mobile telephone, a pager, PDA, media player, a wireless personal computer, a blackberry, a special purpose user identifier, or other device configured to send a user identifier. Additionally, as one of ordinary skill in the art will understand, other components described in this disclosure can have similar components and/or functionality as that described with reference to FIG. 5. As a nonlimiting example, an environment, local network, and remote network can all include (or be coupled to) such logic. As such, the discussion with reference to FIG. 5 can be understood to apply to any of a plurality of elements.

Generally, in terms of hardware architecture, as shown in FIG. 5, the specific user device includes a processor 582, volatile and nonvolatile memory 584, a display interface 594, data storage 595, and one or more input and/or output (I/O) device interface(s) 596 that are communicatively coupled via a local interface 592. The local interface 592 can include, for example but not limited to, one or more buses and/or other wired or wireless connections. The local interface 592 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 582 may be a hardware device for executing software, particularly software stored in volatile and nonvolatile memory 584.

The processor 582 can be any custom made or commercially available processor, a central processing unit (CPU), an auxiliary processor among several processors associated with the specific user device, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80x86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The volatile and nonvolatile memory 584 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 584 may incorporate electronic, magnetic, optical, and/or other types of storage media. Note that the volatile and nonvolatile memory 584 can have a distributed architecture, where various components are situated remote from one another, but can be accessed by the processor 582. Additionally volatile and nonvolatile memory 584 can include communications software 599 and an operating system 586.

The software in volatile and nonvolatile memory 584 may include one or more separate programs, each of which includes an ordered listing of executable instructions for implementing logical functions. In the example of FIG. 5, the software in the volatile and nonvolatile memory 584 may include communications software 599 (which can include logic in one or more separate software packages), as well as operating system 586. A nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc., and Windows CE® available from Microsoft® Corporation). The operating system 586 controls the execution of other computer programs and provides scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 584, so as to operate properly in connection with the Operating System 586.

The Input/Output devices that may be coupled to system I/O Interface(s) 596 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

If the specific user device is a personal computer, workstation, or the like, the software in the volatile and nonvolatile memory 584 may further include a basic input output system (BIOS) (omitted for simplicity). The BIOS is a set of software routines that initialize and test hardware at startup, start the Operating System 586, and support the transfer of data among the hardware devices. The BIOS is stored in ROM so that the BIOS can be executed when the specific user device 106 is activated.

When the specific user device 106 is in operation, the processor 582 is configured to execute software stored within the volatile and nonvolatile memory 584, to communicate data to and from the volatile and nonvolatile memory 584, and to generally control operations of the specific user device 106 pursuant to the software. Software in memory, in whole or in part, are read by the processor 582, perhaps buffered within the processor 582, and then executed.

Figure 6:
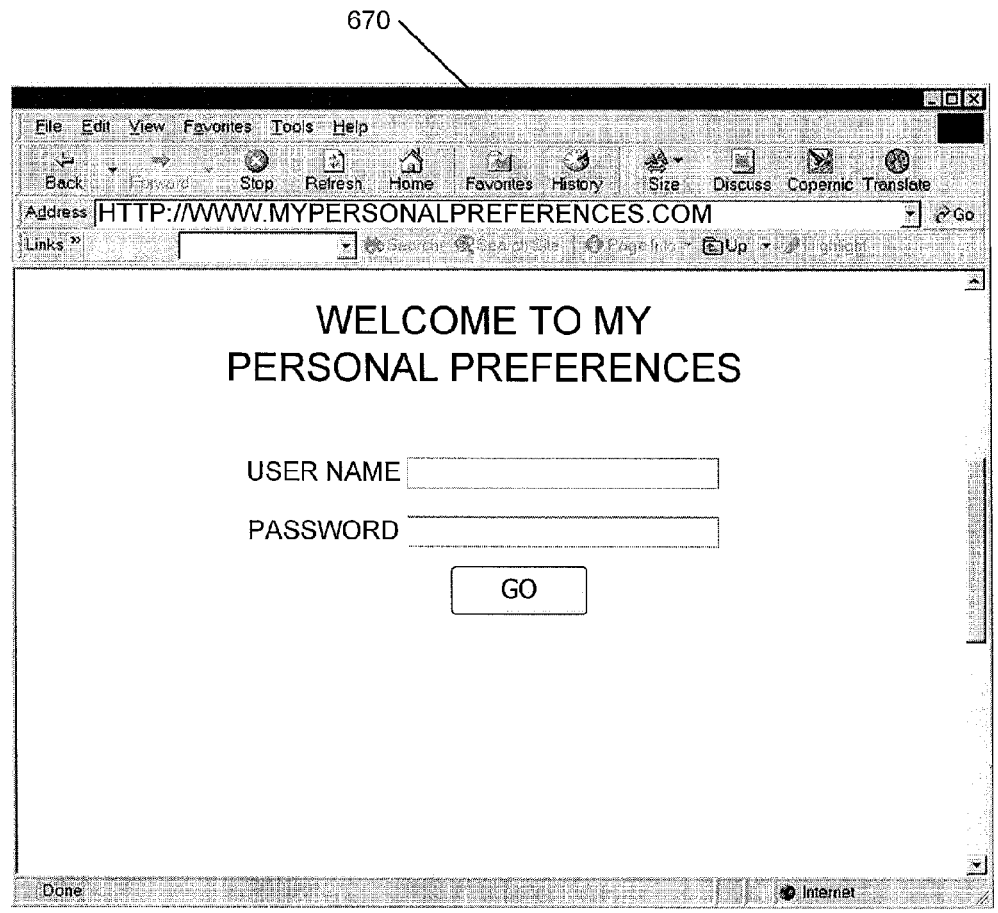
FIG. 6 is an exemplary user interface that can be provided to a user for customizing an environment, such as the automobile from FIG. 2.

FIG. 6 is an exemplary user interface that can be provided to a user for customizing an environment, such as the automobile from FIG. 2. More specifically, while a user can retrieve and/or store any of a plurality of user preferences via the environment, a user may also desire to access the stored preferences. As a nonlimiting example, the user preferences may be accessible via website or other means. With respect to a website configuration, a user may access his or her user preferences by inputting an appropriate Uniform Resource Locator (URL), or otherwise indicating a desire to access the website. In the nonlimiting example of FIG. 6, upon inputting a desired URL, window 670 may be displayed to request a user authentication. In the nonlimiting example of FIG. 6, the user authentication includes a user name and password, however this is not a requirement. As one of ordinary skill in the art will understand, any authentication process can be implemented including biometric authentication, as well as receipt of a user identifier from specific user device 106. Upon appropriate authentication, the user may gain access to various aspects of the website.

Figure 7:
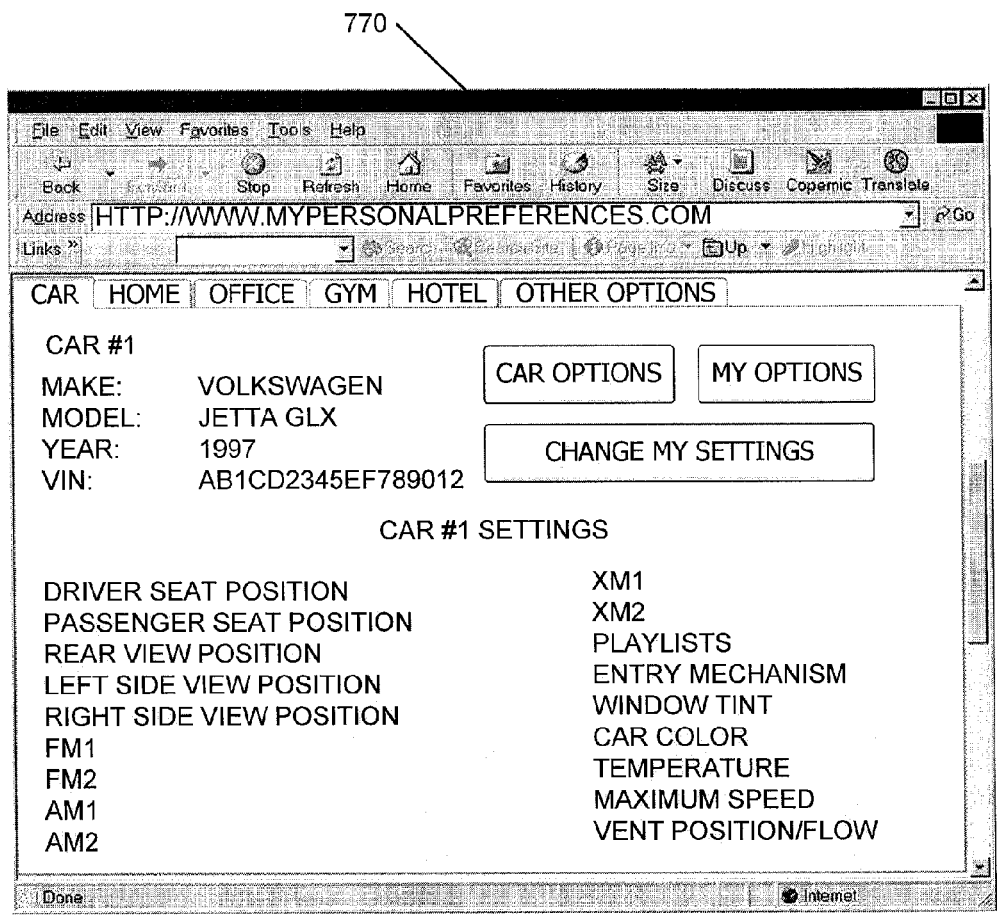
FIG. 7 is an exemplary user interface that can be provided to a user for viewing various customization options in an environment, such as the automobile from FIG. 2.

FIG. 7 is an exemplary user interface that can be provided to a user for viewing various customization options in an environment, such as the automobile from FIG. 2. More specifically, in the nonlimiting example of FIG. 7, window 770 includes a plurality of tabs related to environments. The tabs include car, home, office, gym, hotel, and other options. More specifically, in the nonlimiting example of FIG. 7, a website user's primary automobile is listed. Additionally listed are various configurable options that the website user can set for that environment. Also included in the nonlimiting example of FIG. 7 is a "car options" option, a "my options" option, and a "change my settings" option.

Figure 8:
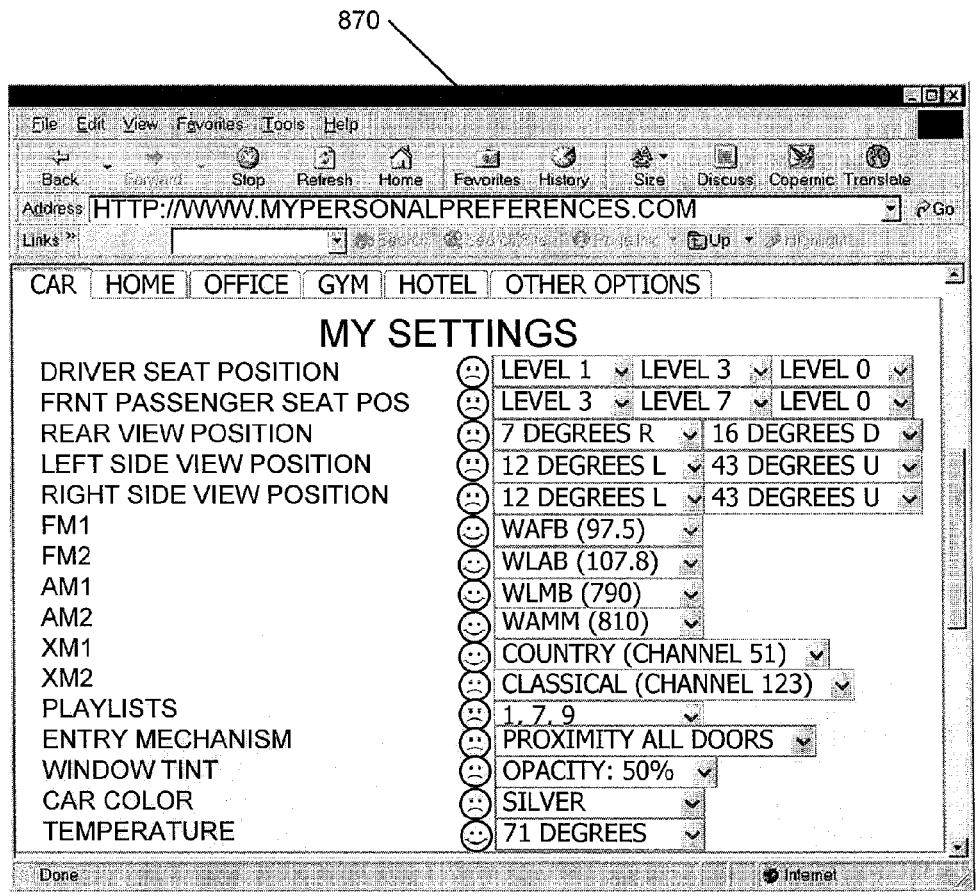
FIG. 8 is an exemplary user interface for providing user options to change at least one user preference in an environment, such as the automobile from FIG. 2.

FIG. 8 is an exemplary user interface for providing user options to change at least one user preference in an environment, such as the automobile from FIG. 2. As shown in the nonlimiting example of FIG. 8 window 870 illustrates a "my settings" page, under the car tab. The my settings page displays a plurality of configuration options associated with an automotive environment, as well as the website user's preferences related to each of those preferences. More specifically, one of the configuration options is driver seat position. Illustrated are three settings, which correlate to various settings such as incline, lumbar support, tilt, etc. While three options related to seat position are provided, as one of ordinary skill in the art will understand, more or less options may be provided, depending on the environment.

Also included are options to set passenger seat position, mirror position, media channels, entry mechanism, window tint, car color, and temperature. More or less options may be provided depending on the particular configuration. More specifically, as illustrated in FIG. 7 (above), the website user's primary automobile is a Volkswagen Jetta. This particular car may be configured with a plurality of configurable options. The options of this automobile may differ than options of another automobile. Therefore, if the website user enters an automobile with different configurable options, the website user may wish to set preferred settings for those options as well. These additional options can be displayed on the my settings page.

One should also note that upon entering an environment that includes configurable options that are different than those currently set by the website user, the remote network 210 can be configured to make assumptions based on the website user's current preferences. More specifically, if the website user's automobile does not have an option to adjust seat position in the back seat, the remote network 210 may not have a user preference for that setting. If the website user then sits in a back seat of an automobile that includes a configurable seat position, the remote network will likely not have a user preference. In such a situation, the remote network 210 can assume that the website user would desire to have a seat position similar to that of the front passenger seat position illustrated in FIG. 8. The remote network can then add this user preference to the my settings page. If the website user desires to change the assumed setting, he or she can do so in the environment or at the my settings page.

Also included in the my settings page is a universal setting indicator. More specifically, adjacent to at least one of the user preferences is an indicator as to whether this user preference is universal for all environments. More specifically, in the nonlimiting example of FIG. 8, the website user has indicated that the radio stations FM1, FM2, AM1, AM2, and XM1 are universal for all environments, but that XM2 is not universal. The website user can change the universality of the options by selecting the universal setting indicator.

Figure 9:
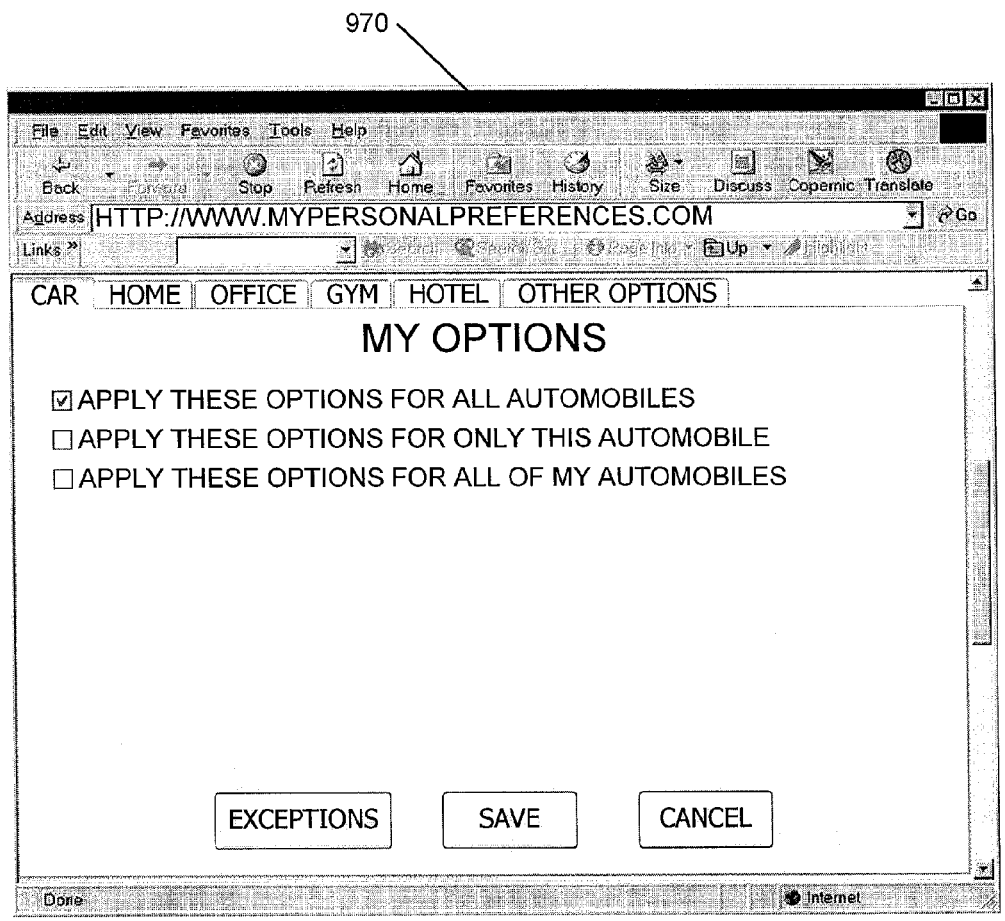
FIG. 9 is an exemplary user interface for providing personal options related to various environments, similar to the user interface from FIG. 8.

FIG. 9 is an exemplary user interface for providing personal options related to various environments, similar to the user interface from FIG. 8. More specifically, a website user can select to apply the user preferences to all automobiles, only this automobile, or automobiles that the user has selected. Additionally, the website user can define exceptions to the settings defined in FIG. 8 (e.g., the user wants a seat position except in a certain type of car, etc.).

Figure 10:
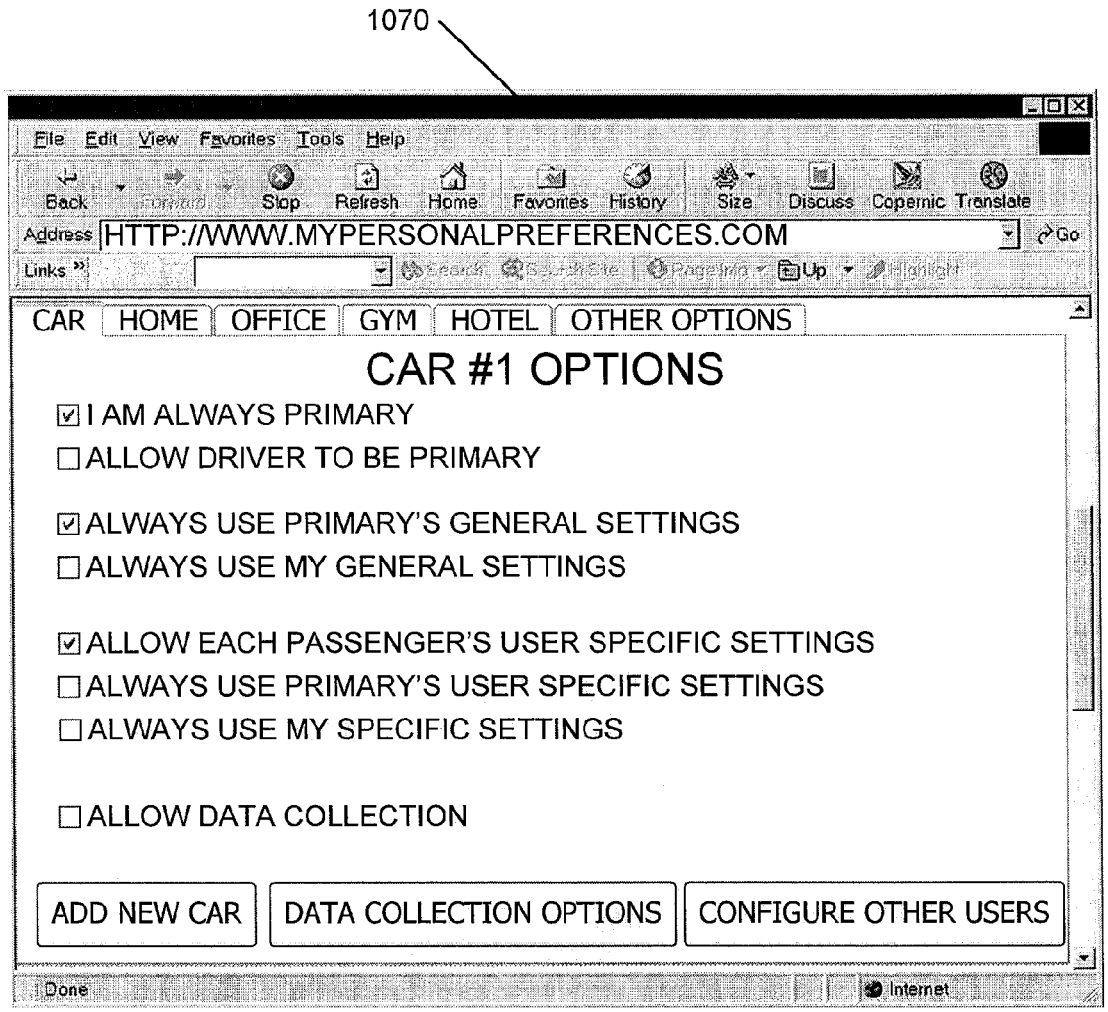
FIG. 10 is an exemplary user interface for providing options for a particular environment, such as the automobile from FIG. 2.

FIG. 10 is an exemplary user interface for providing options for a particular environment, such as the automobile from FIG. 2. These options can include the ability for a website user to determine how a particular environment reacts to various user preferences. More specifically, FIG. 10 includes a car options window 1070 that includes determining who is the primary user of this particular environment. When a plurality of users enter an environment, the environment 102 (and/or remote network 210) may receive data from two users, and be unable to determine between conflicting preference data. Be selecting "I am always primary" the website user has determined that whenever the website user is located proximate the environment 102, the website user is primary and thus his (or her) preferences take priority over others. If the website user selects "allow driver to be primary" the driver's preferences will take priority. Other configurations are also considered.

Additionally included in the car options window 1070 is an option for the user to determine how general settings are applied to this environment. A general setting can include those settings that apply to all (or at least a plurality) of the users in an environment. Depending on the particular environment, general settings can include radio stations, temperature, humidity, sunroof position, etc. By selecting the "always use primary's general settings" the environment will always default to those preferences defined by the primary user. The "always use my general settings" option, the general settings will automatically default to this user's preferences, however, they can be subsequently changed by users in the environment.

Also included in the nonlimiting example of FIG. 10 is an "allow each passenger's user specific settings" option. By selecting this option, the environment can set specific settings pursuant to each user of the environment. More specifically, depending on the particular environment, specific settings can include seat position, mirror position, vent position, temperature, etc. If the website user selects the "always use primary's user specific setting" option, the environment will default to the primary user's preferences, regardless of the preferences of other users in the environment. With the "always use my specific settings," the website user's preference will dictate, regardless of other users (primary and/or secondary) in the environment. With such a selection, the website user need not be proximate to the environment, but those users who are proximate can change the current settings.

Also included in the nonlimiting example of window 1070 is an "allow data collection" option. As discussed in more detail below, the website user can permit data collection regarding other users' actions within and proximate the environment. Additionally, window 1070 can allow the website user to add a new car, set data collection options and configure other users.

Other options can also be included in the nonlimiting example of FIG. 10, including options for determining priority for receiving data from a remote network 210 or a user device 106. More specifically, in at least one embodiment, the user can determine whether preference data is stored on the user device 106. If preference data is stored on the user device 106, the user can determine whether the environment uses the preference data from the user device 106 when the remote network 210 is inaccessible or whether the environment utilizes previous user settings. Other configurations can provide that the preference data stored on the user device 106 is utilized in this environment only with preference data that is otherwise not stored on remote network 210. Still other configurations can provide priority settings between the user device 106 and the remote network 210 (universally for the environment, for each setting, for each type of setting, for particular users, etc.). As a nonlimiting example, if the remote network 210 associates a desired temperature for a particular environment at 72 degrees, but the user device 106 associates a desired temperature at 70 degrees, the user has the ability to determine whether the remote network 210 or the user device 106 has priority.

Figure 11:
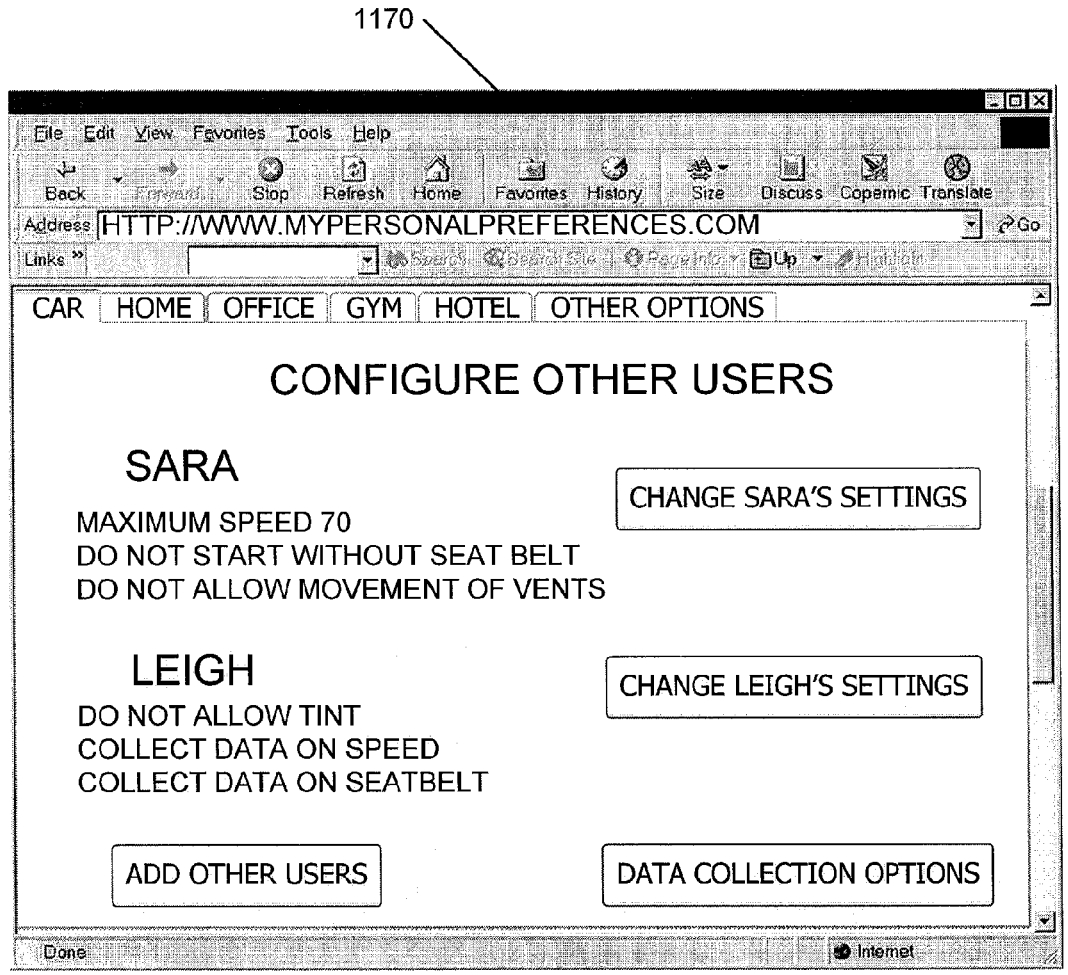
FIG. 11 is an exemplary user interface illustrating further options related to a particular environment, similar to the user interface from FIG. 10.

FIG. 11 is an exemplary user interface illustrating further options related to a particular environment, similar to the user interface from FIG. 10. More specifically, the nonlimiting example of FIG. 11 includes a configure other users window 1170. The configure other users window 1170 can include settings that the website user defines for other users, such as maximum speed, seatbelt control, tint control, data collection, etc. The website user also has the option of changing those settings and defining data collection options.

Figure 12:
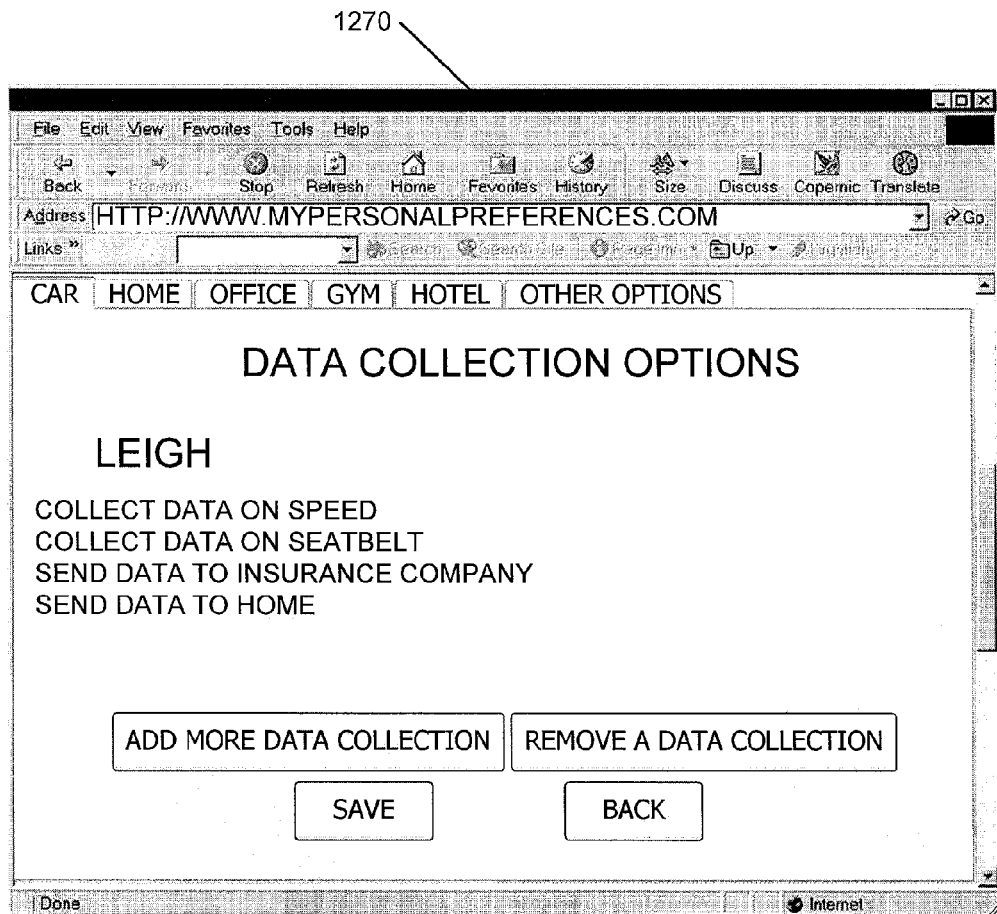
FIG. 12 is an exemplary user interface for providing data collection options for a user, similar to the user interface from FIG. 11.

FIG. 12 is an exemplary user interface for providing data collection options for a user, similar to the user interface from FIG. 11. More specifically, the nonlimiting example of FIG.

12 includes a data collections options window 1270 that can be accessed by selecting the "change Leigh's settings" option from FIG. 11. By making this selection, the website user is provided with the ability to add and/or remove various settings related to that particular user. Other users can be configured similarly.

Figure 13:
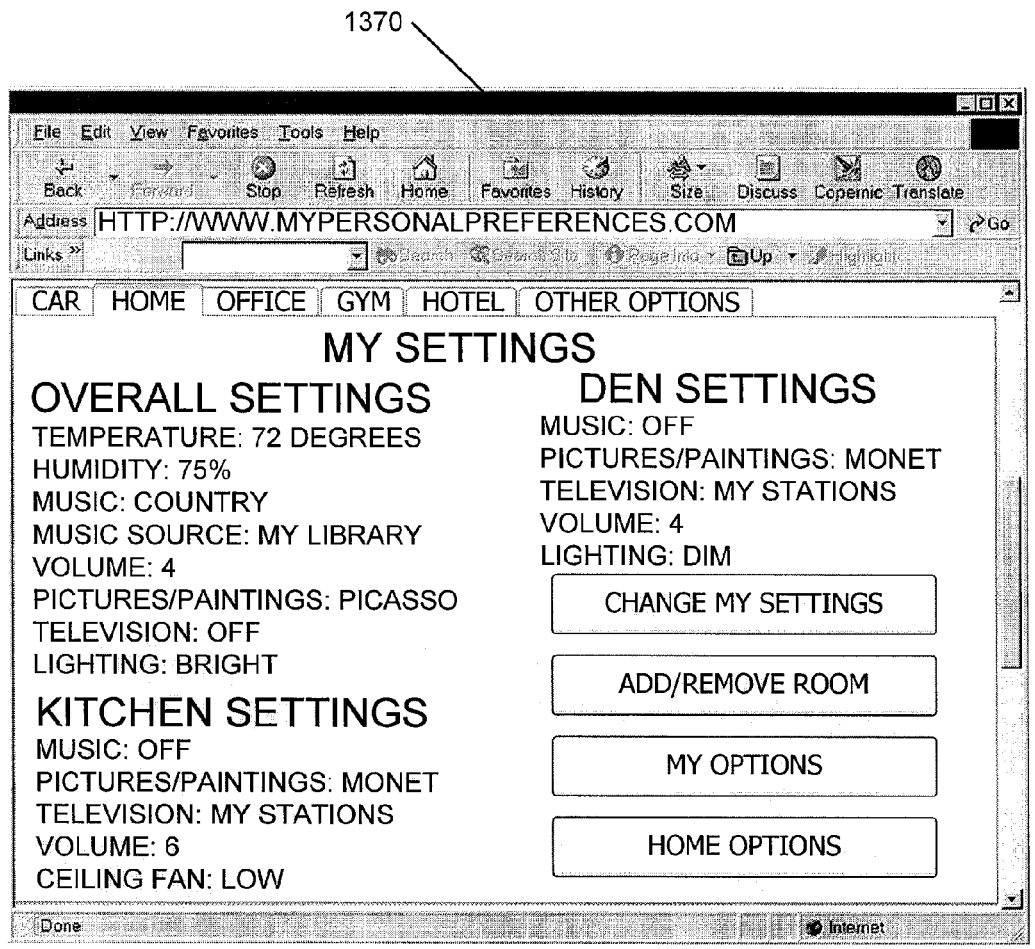
FIG. 13 is an exemplary user interface for viewing various user settings in an environment such as a home, similar to the settings from FIG. 7.

FIG. 13 is an exemplary user interface for viewing various user settings in an environment such as a home, similar to the settings from FIG. 7. More specifically, the nonlimiting example of FIG. 13 includes a my settings window 1370 associated with the home tab. As illustrated, the my settings window 1370 can include overall settings for this type of environment, as well as setting related to specific rooms and/or areas of that environment. In the overall settings, various preference data is listed for settings that can apply to the environment as a whole, as well as preferences that the website user desires to apply to more than one room/area of the environment. Listed in the my settings window 1370, under the "overall settings" header are temperature, humidity, music, music source, volume, pictures/paintings, television, and lighting.

Additionally listed are specific areas of the environment that the user has included preference data. Generally speaking, the "room settings" (which can include den settings, kitchen settings, as well as other rooms) portion of the window 1370 can be configured to list those preferences that contradict the overall settings and/or those settings that only apply to that particular room. More specifically, in the kitchen, the website user has indicated that music is off. This preference contradicts the overall settings, where the music is set at a volume of 4. Additionally, the website user has defined that the ceiling fan is set to low in the kitchen. As a ceiling fan may not be present in all rooms of the environment, this setting can be listed under the kitchen settings category (the room where a ceiling fan is present).

Additionally listed in the my settings window 1370 is a "change my settings" option, an "add/remove room" option, a "my options" option, and a "home options" option. Other options may also be provided depending on the particular configuration.

Figure 14:
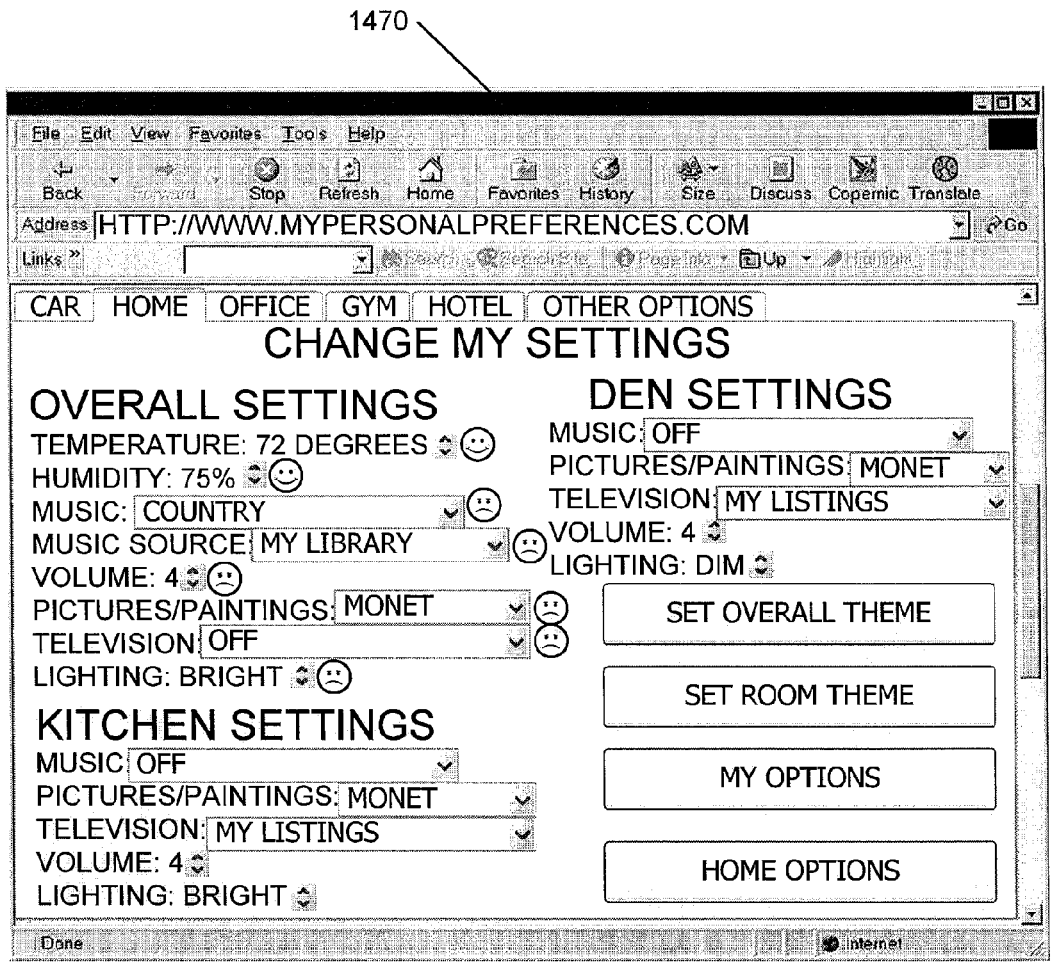
FIG. 14 is an exemplary user interface for changing various user settings in an environment, similar to the user interface from FIG. 13.

FIG. 14 is an exemplary user interface for changing various user settings in an environment, similar to the user interface from FIG. 13. More specifically, the nonlimiting example of FIG. 14 includes a change my settings window 1470 that can provide a website user with the ability to manually determine various settings for a particular type of environment. Additionally included are universal setting indicators, similar to those illustrated in FIG. 9.

Figure 15:
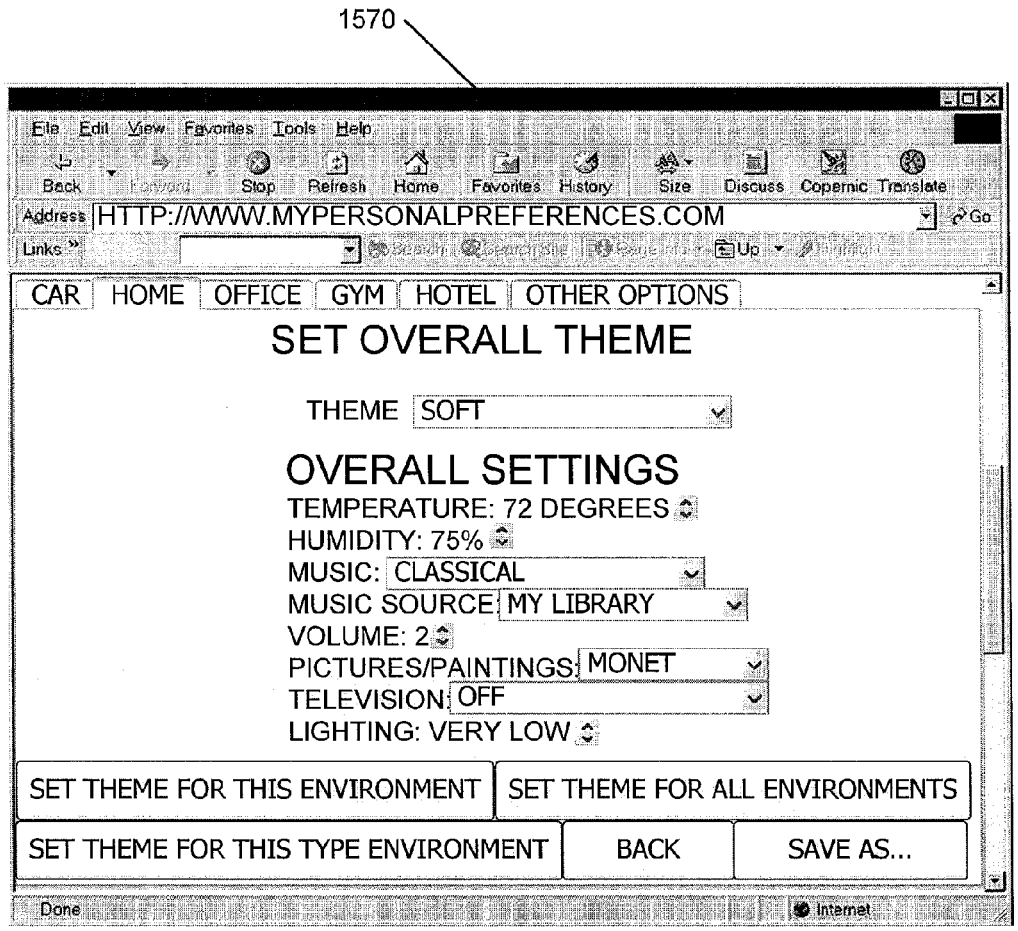
FIG. 15 is an exemplary user interface for determining various settings in an environment through selection of a theme, similar to the interface from FIG. 14.

FIG. 15 is an exemplary user interface for determining various settings in an environment through selection of a theme, similar to the interface from FIG. 14. More specifically, the nonlimiting example of FIG. 15 includes a "set overall theme window" 1570 to provide the website user in order to determine settings by selecting a theme. Because an environment can have so many user-configurable settings, the website user may desire that the remote network determine the settings. As such, the website user can select an overall theme for a particular environment, type of environment or all environments. The remote network can then convert this theme into settings associated with that theme.

As illustrated in FIG. 15, the theme "soft" can include a temperature of 72 degrees with 75% humidity, classical music, etc. Additionally, depending on the environment(s) the website user applies this theme, other settings can also be configured via the theme option.

Figure 16:
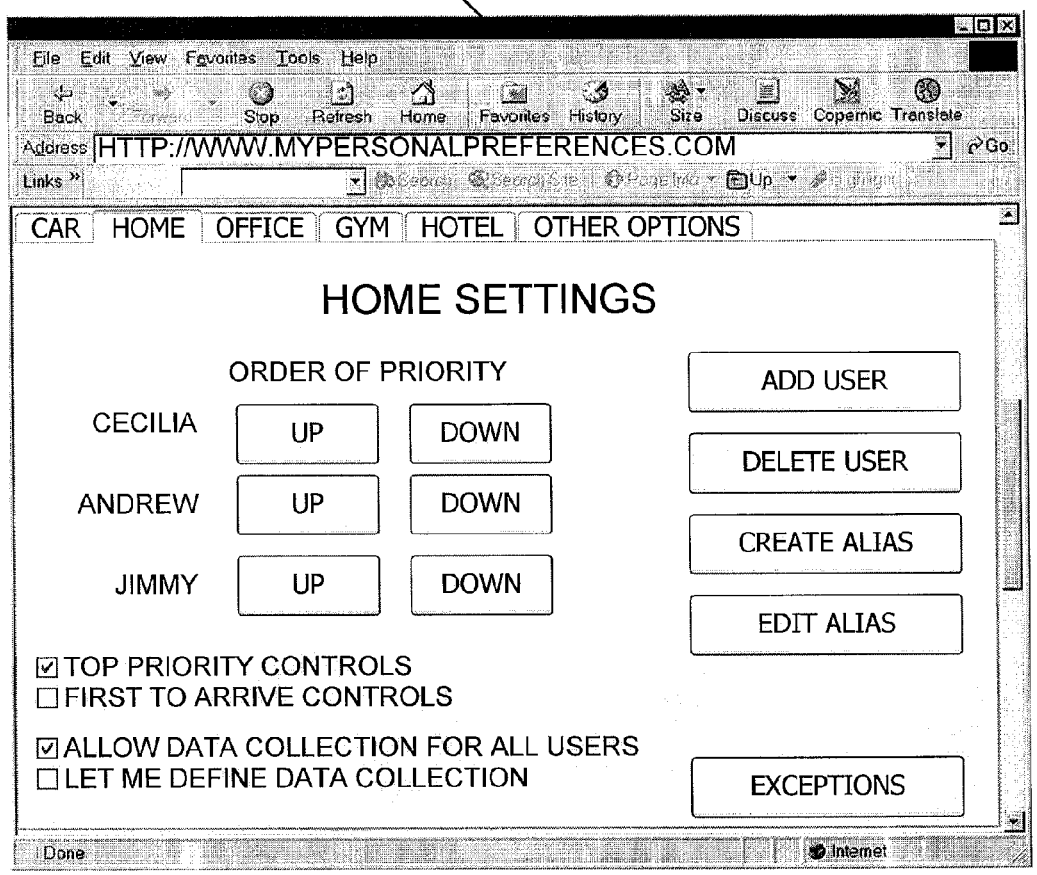
FIG. 16 is an exemplary user interface for determining settings for an environment, such as the environment from FIG. 13.

FIG. 16 is an exemplary user interface for determining settings for an environment, such as the environment from FIG. 13. More specifically, the nonlimiting example of FIG. 16 includes a home settings window 1670 to provide a website user with the ability to determine various settings related to this particular environment. The settings displayed in FIG. 16 include an option to determine the order of priority of a user in the environment. More specifically, if a plurality of users are proximate the environment, the remote network may have difficulty determining the preference data to apply to that environment. Therefore, the home settings window 1670 determines the control priority of users in an environment. Also included is an option to determine whether top priority controls, or whether the first to arrive in the environment controls. Also included are data collection options, as well as an exceptions option.

The exceptions option can be configured to provide the website user with the ability to create exceptions to the settings defined in the home settings window 1670. Such exceptions can include exceptions based on room (Jimmy will likely want his preferences to take priority over all others in his bedroom and bathroom), as well as exceptions based on a particular setting in the environment (i.e., a particular chair, etc.). Other options may also be accessed in response to the website user selecting the exceptions option.

Additionally included in the nonlimiting example of FIG. 16 is a create alias option and an edit alias option. The create alias option can be configured to provide the user with the ability to determine one or more alias for a particular environment or a particular portion of an environment (such as a room in a house). The edit alias option provides the user with the ability to change settings for a particular alias, delete an alias, etc.

As a nonlimiting example, Cecilia may desire that the temperature of the living room is set to 72 degrees, and that all medical programs on the television are arranged first on the television guide. However, Cecilia may also understand that when Jimmy is in the living room with her, Jimmy will want the room temperature at 73 degrees and that the television guide list soap operas first in the television guide. By creating an alias, (which Cecilia can name "C and J" or other name), Cecilia can determine that when she and Jimmy are in the living room together, that medical programming is not displayed on the television guide. In at least one embodiment, the alias can be seen as a single user requiring two (or more) user identifiers to authenticate.

Figure 17:
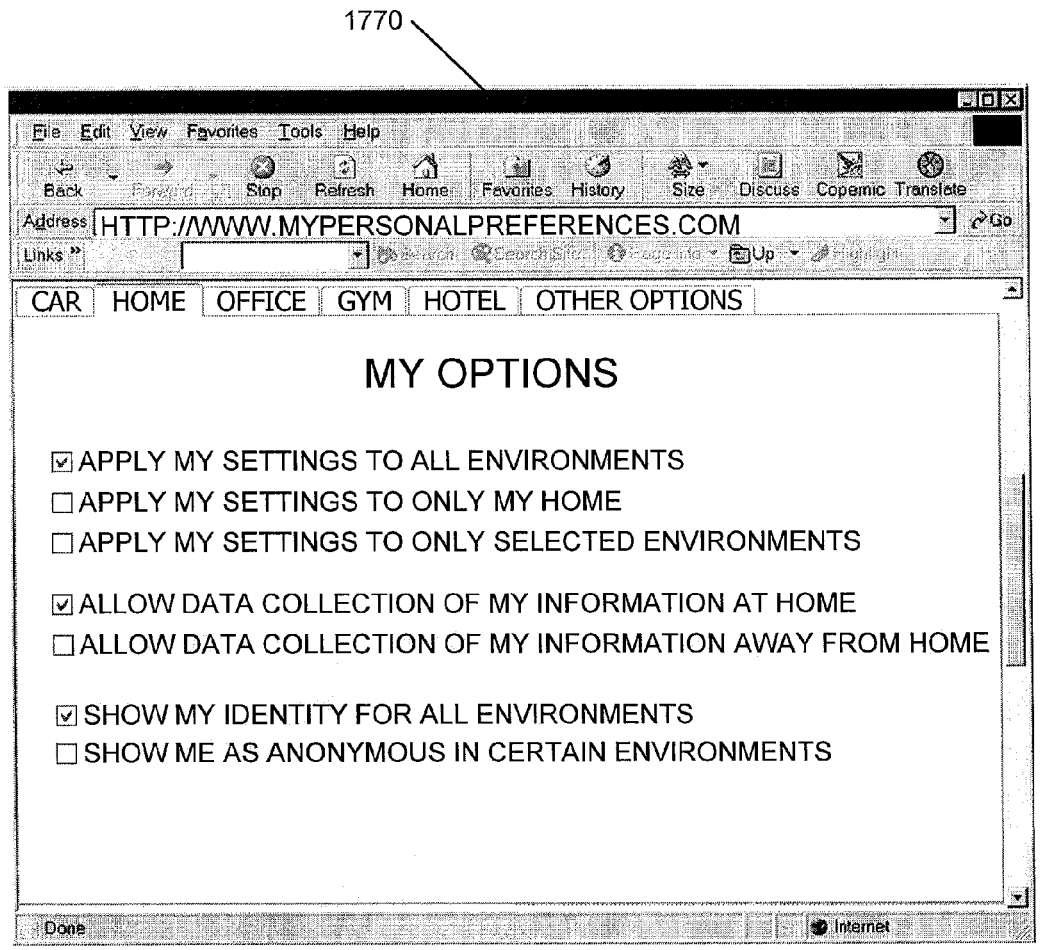
FIG. 17 is an exemplary user interface for determining user options in various environments, such as the environment from FIG. 13.

FIG. 17 is an exemplary user interface for determining user options in various environments, such as the environment from FIG. 13. More specifically, the nonlimiting example of FIG. 17 includes a my options window 1770 that is configured to provide user specific options for this type of environment. More specifically, the website user can determine whether the options selected in FIG. 14 apply to all environments, only to "my home," or only to selected environments. Additionally, the website user can determine whether to allow data collection at home and away from home.

Also included in the nonlimiting example of FIG. 17 is an anonymous option. More specifically, by selecting "show me as anonymous for selected environments, the user determines that for one or more environments, his (or her) identity is seen as anonymous and his (or her) user preferences are not applied to that environment. Depending on the configuration for a particular environment, options can also be provided to prevent anonymous users from entering the environment. Other options may also be provided.

Figure 18:
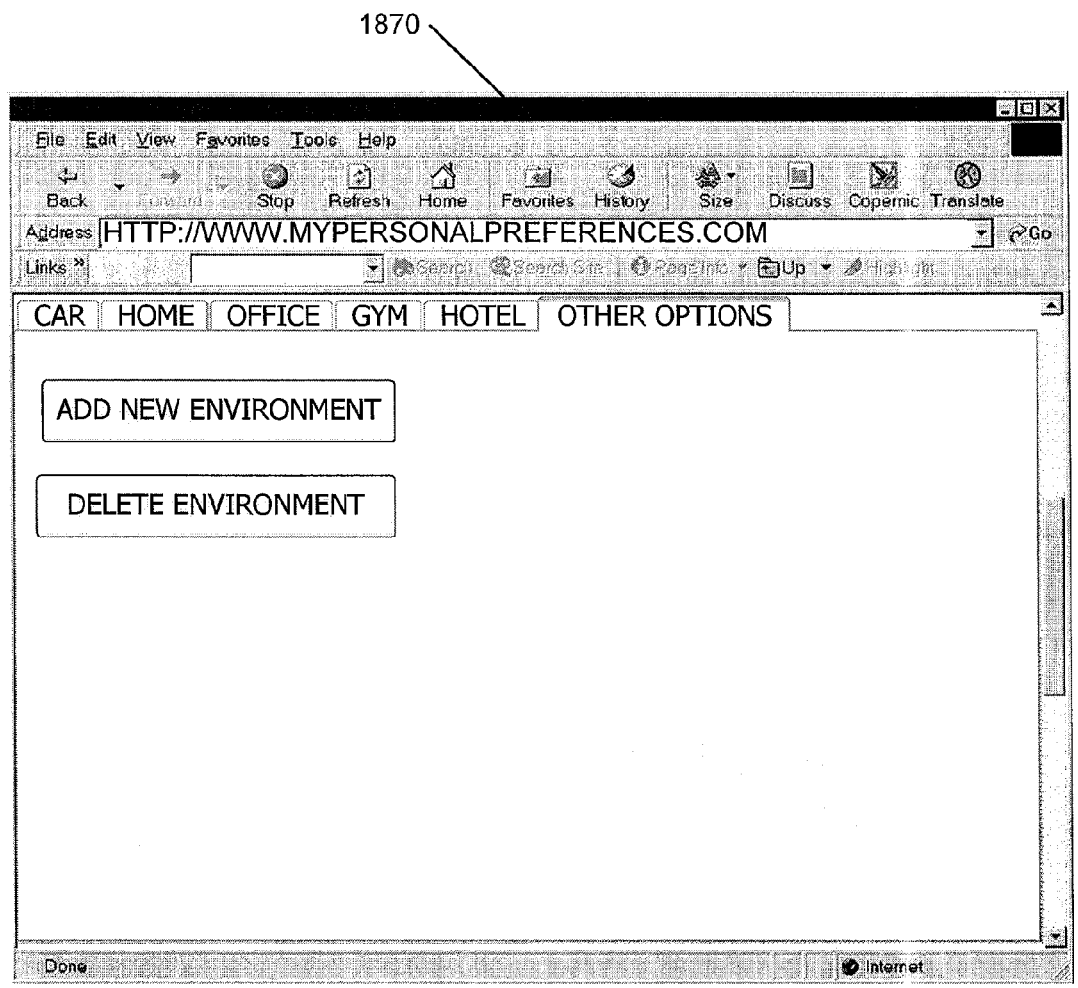
FIG. 18 is an exemplary user interface for providing various options to a user related to an environment such as the environments from FIGS. 7 and 13.

FIG. 18 is an exemplary user interface for providing various options to a user related to an environment such as the environments, from FIGS. 7 and 13. More specifically, embodiments of the other options window 1870 can be configured to provide a website user with the ability to add a new environment and delete an existing environment. Other options can also be provided.

One should note that while the above discussion relates to the automobile and home environment types, other environment types can also be included. More specifically, a website user can determine user preferences for environment types such as office, gym, hotel, retail establishments, as well as sub categories of those environment types (e.g., specific environments, such as my home, my car, etc.). Additionally, options can be provided to apply various preferences across various environments and/or environment types.

One should also note that while this disclosure refers to a website user, this term is not intended to limit the disclosure. As one of ordinary skill in the art will understand, the term website user is used to refer to any user who desires to set, change, add, remove, or otherwise configure preferences related to an environment or environment type.

Figure 19:
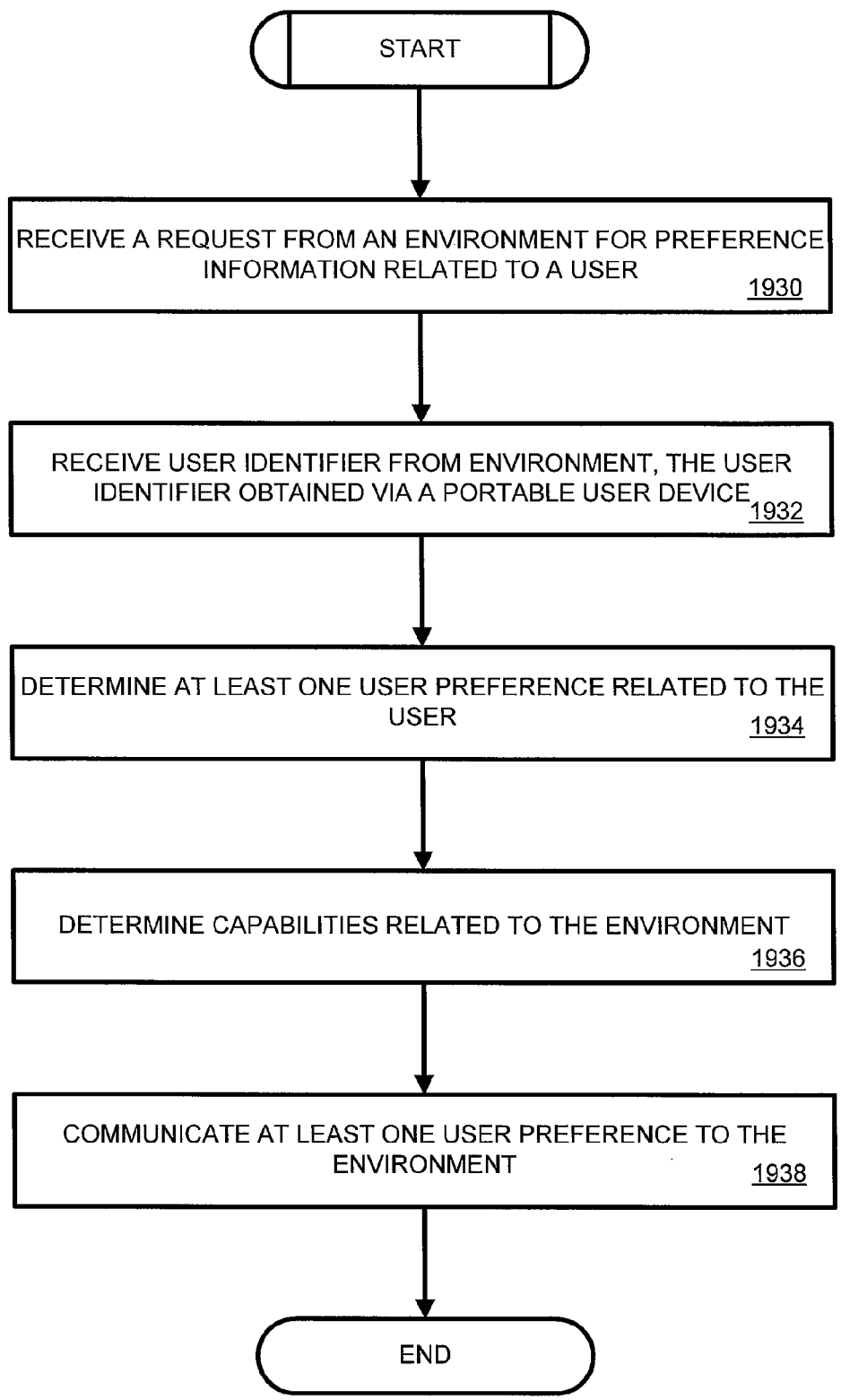
FIG. 19 is a flowchart illustrating exemplary steps that can be taken by a remote network in communicating at least one user preference to an environment, such as the automobile from FIG. 2.

FIG. 19 is a flowchart illustrating exemplary steps that can be taken by a remote network in communicating at least one user preference to an environment, such as the automobile from FIG. 2. More specifically, the first step in the nonlimiting example of FIG. 19 is for the remote network 210 to receive a request from an environment for preference information related to a user (block 1930). As discussed above, if an environment determines that preference data is not available locally, the environment can send a request to the remote network 210 for the preference information. Once the request is received, the remote network 210 can receive a user identifier from the environment, where the user identifier is obtained via a portable user device (block 1932). Next, the remote network 210 can determine at least one user preference related to the user (block 1934). This can include utilizing the user identifier to access a database to retrieve preference data related to that user. Next, the remote network 210 can determine capabilities related to the environment (block 1936). Determining capabilities related to an environment can include determining whether the environment is a primary environment (such as the environments from FIGS. 7 and 13, however this is not a requirement. Once the capabilities of the environment are determined, the remote network 210 can communicate at least one user preference to the environment (block 1938).

Figure 20:
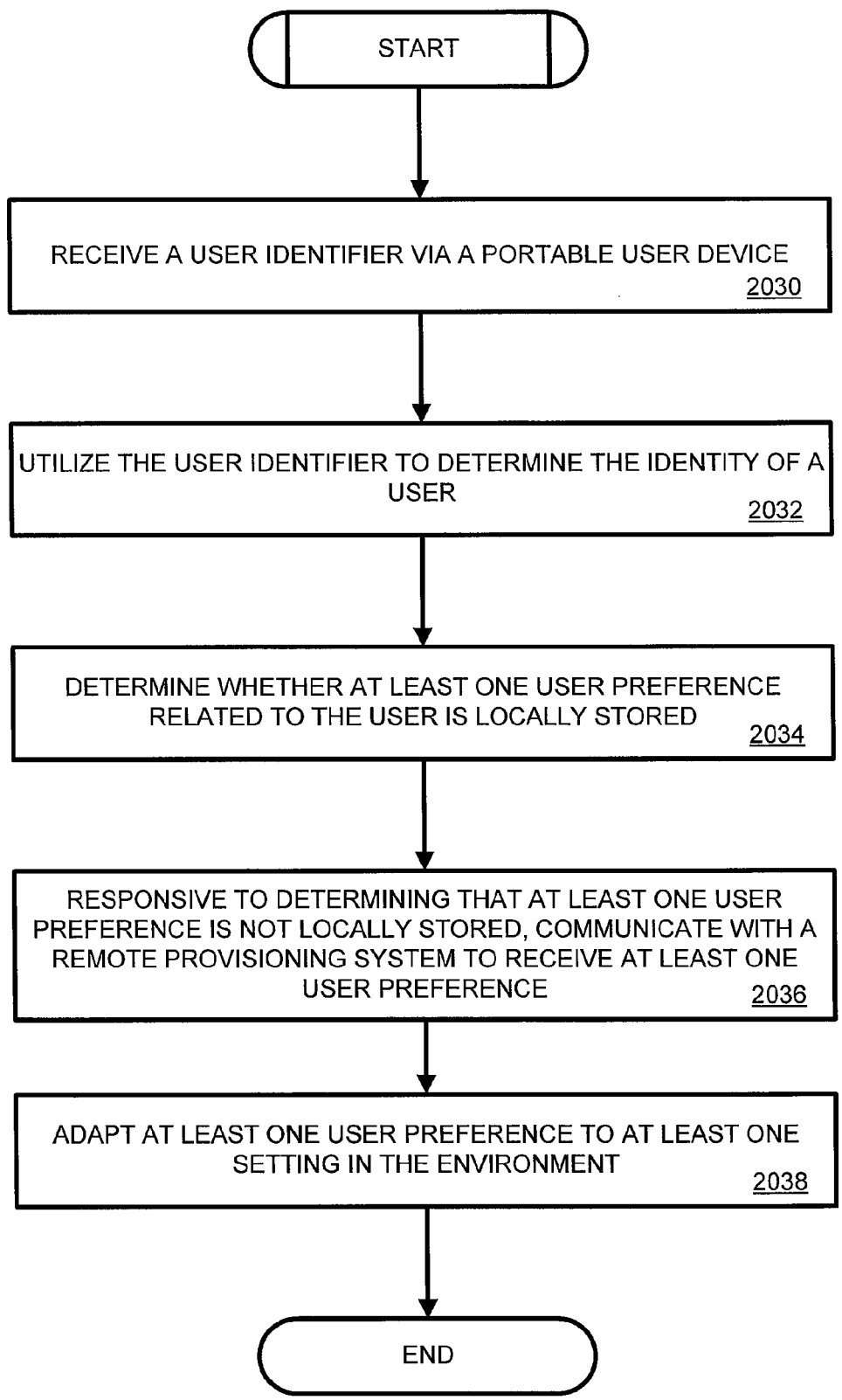
FIG. 20 is a flowchart illustrating exemplary steps that can be taken by an environment for receiving at least one user preference, similar to the flowchart from FIG. 19.

FIG. 20 is a flowchart illustrating exemplary steps that can be taken by an environment for receiving at least one user preference, similar to the flowchart from FIG. 19. More specifically, the first step in the nonlimiting example of FIG. 20 is for the environment to receive a user identifier via a portable user device 106 (block 2030). Next, the environment can utilize the received user identifier to determine the identity of a user (block 2032). As discussed above, this step can include determining whether the user's identity is stored locally, and if not, accessing a remote network 210 to determine the user's identity. Once the user's identity is determined, the environment can determine whether at least one user preference related to the user is locally stored (block 2034). The environment can then, responsive to determining that at least one user preference is not locally stored, communicate with a remote provisioning system to receive at least one user preference (block 2036). The environment can then adapt the at least one user preference to at least one setting in the environment (block 2038).

Figure 21:
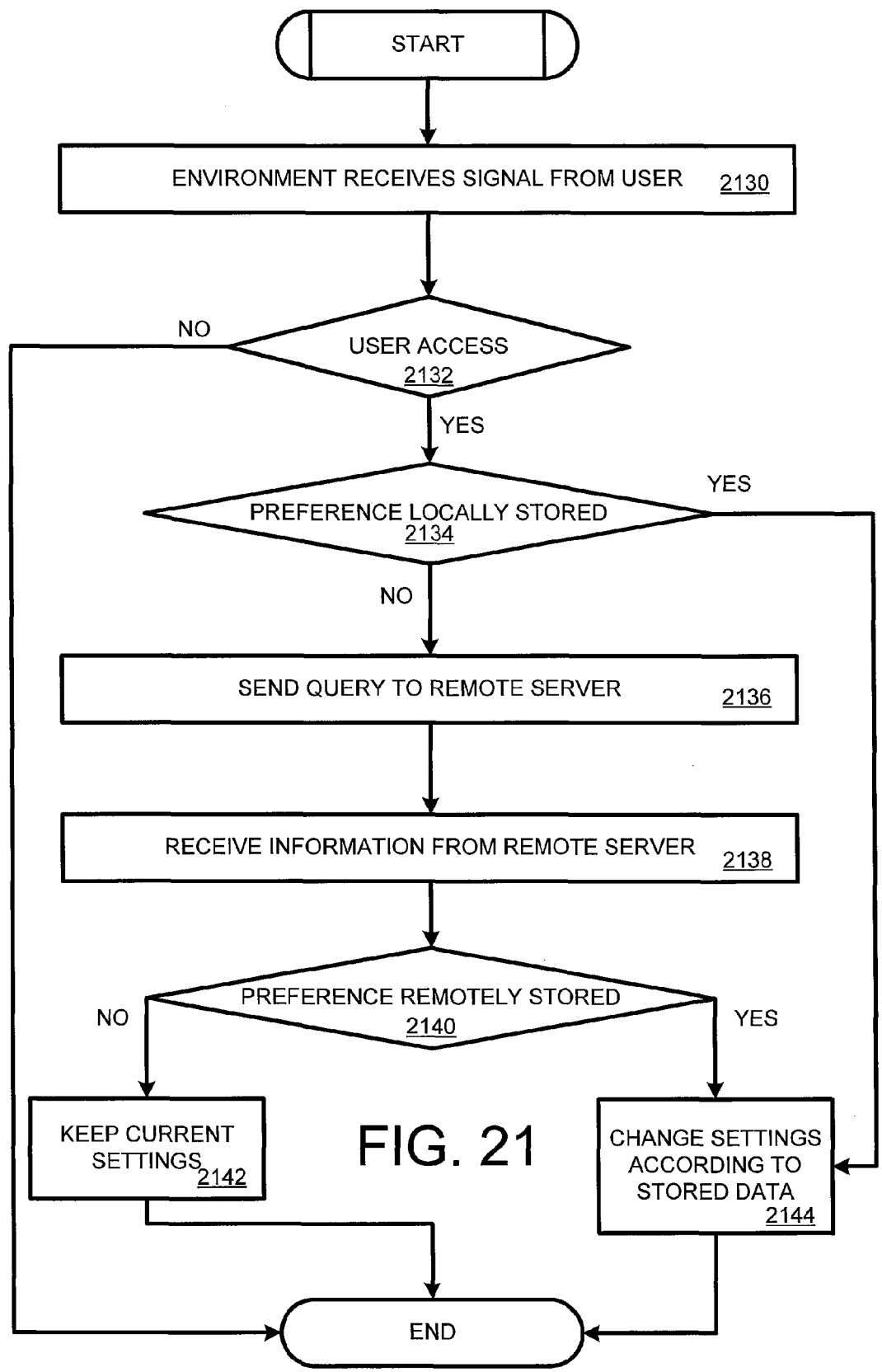
FIG. 21 is a flowchart illustrating exemplary steps that can be taken by an environment to change at least one setting according to a user preference, similar to the flowchart from FIG. 20.

FIG. 21 is a flowchart illustrating exemplary steps that can be taken by an environment in to change at least one setting according to a user preference, similar to the flowchart from FIG. 20. The first step in this nonlimiting example is for an environment to receive a signal from a user (block 2130). As discussed above, the signal may be sent via a portable specific user device 106, however this is not a requirement. The environment can then determine whether the user has access to the environment (block 2132). Access to the environment can be gained (depending on the particular environment) via a key, remote keyless device, and/or other means. If the user does not have access to the environment, the process ends. If, however, the user has access to the environment, the environment can determine whether a user preference related to this user is locally stored (block 2134). If a preference is locally stored, the environment can change settings according to the stored data (block 2144). If, however, a preference is not locally stored, the environment can send a query to a remote network 210 (block 2136) to determine at least one user preference related to this environment and this user. The environment can then receive information from the remote network 210 that indicates whether a preference is remotely stored (block 2138). The environment can then determine whether a preference is stored remotely (block 2140), and if so, the environment can change the settings according to the stored preference data (block 2144). If, however, preference data is not remotely stored, the environment can keep the current settings (block 2142).

Figure 22:
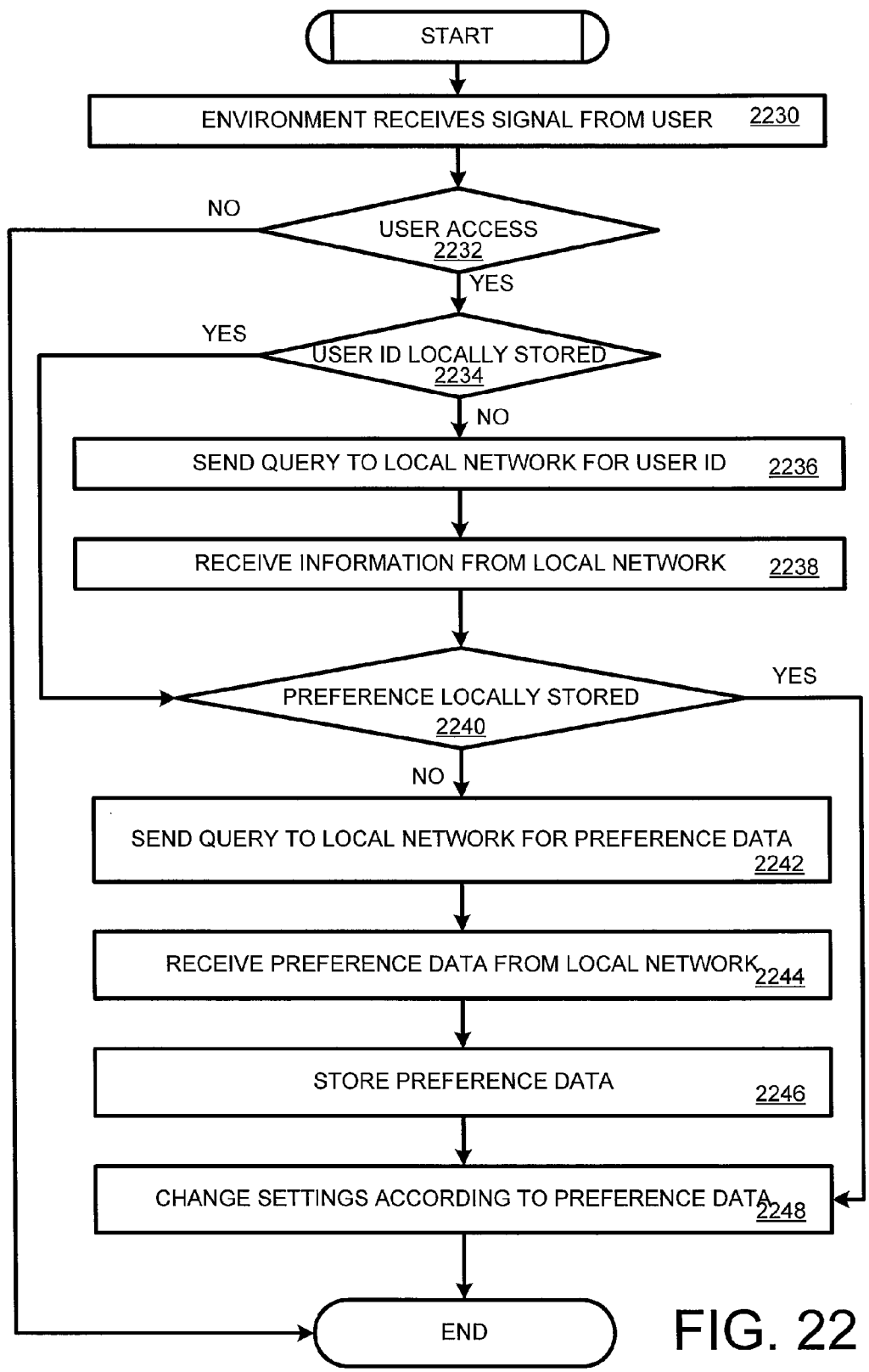
FIG. 22 is a flowchart illustrating exemplary steps that can be taken by an environment to receive user preferences from a network, such as the network from FIG. 3.

FIG. 22 is a flowchart illustrating exemplary steps that can be taken by an environment to receive user preferences from a network, such as the network from FIG. 3. The first step in the nonlimiting example of FIG. 22 is for the environment to receive a signal from a user (block 2230). As indicated above, the signal can include a user identifier and/or data for gaining access to the environment. Upon receiving the signal, the environment can determine whether the user has access to the environment (block 2232), and if not the process ends. If the user has access to the environment, the environment can determine whether data related to the received user identifier is stored locally (block 2234). If the data is stored locally, the process can proceed to block 2240. If the data related to the user identifier is not stored locally, the environment can send a query to a local network 310 to determine the user's identity (block 2240). Upon sending the query, the environment can receive information from the local network 310 (block 2238). The environment can then determine whether preference data related to this user is stored locally (block 2240). If presence data is stored locally, the environment can change settings according to the stored preference (block 2248). If the preference data is not stored locally the environment can sent a query to the local network 310 for the preference data (block 2242). The environment can then receive preference data from the local network 310 (block 2244). The environment can then store the received preference data (block 2246), and change the settings according to the received preference data (block 2248).

Figure 23:
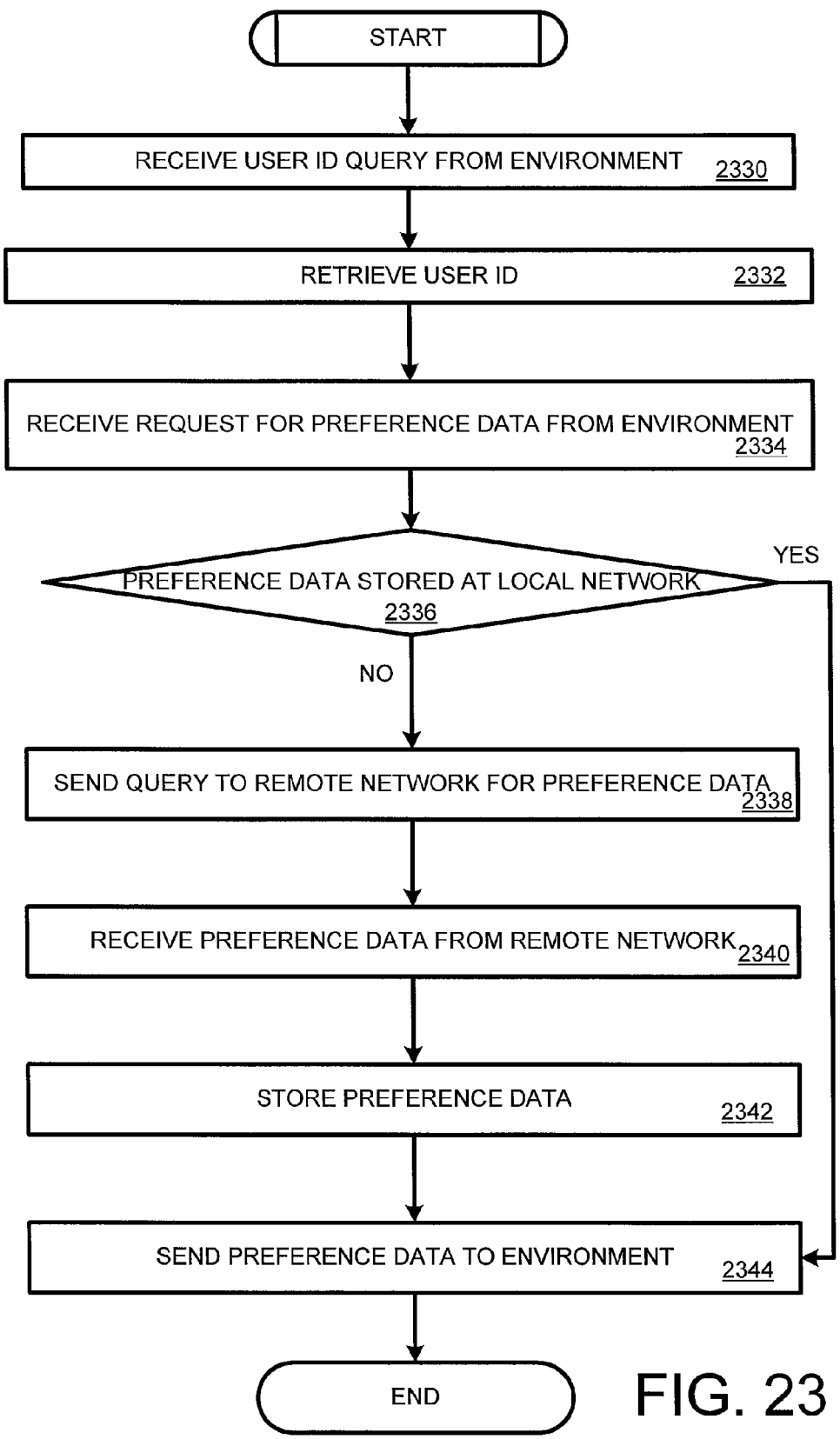
FIG. 23 is a flowchart illustrating exemplary steps that can be taken by a local network in providing user preferences to an environment, such as the environment from FIG. 3.

FIG. 23 is a flowchart illustrating exemplary steps that can be taken by a local network 310 in providing user preferences to an environment, such as the environment from FIG. 3. More specifically, the first step in the nonlimiting example of FIG. 23 is for a local network 310 to receive a user ID query from an environment (block 2330). The local environment can then retrieve the user ID (block 2332) and send the user ID to the environment. The local network 310 can then receive a request for preference data from the environment (block 2334). The preference data can be associated with a particular environment, and/or a particular environment type, as well as the user whose identity has been determined. Next, the local network 310 can determine whether preference data is stored at the local network 310 (block 2336). If preference is stored at the local network 310, the local network 310 can send the preference data to the environment (block 2344). If the local network 310 determines that the preference data is not stored at the local network 310, the local network 310 can send a query to a remote network 210 for the preference data (block 2338). The local network 310 can then receive preference data from the remote network 210 (block 2340). Upon receiving the preference data, the local network 310 can store the received preference data (block 2342) and send at least a portion of the preference data to the environment (block 2344).

Figure 24B:
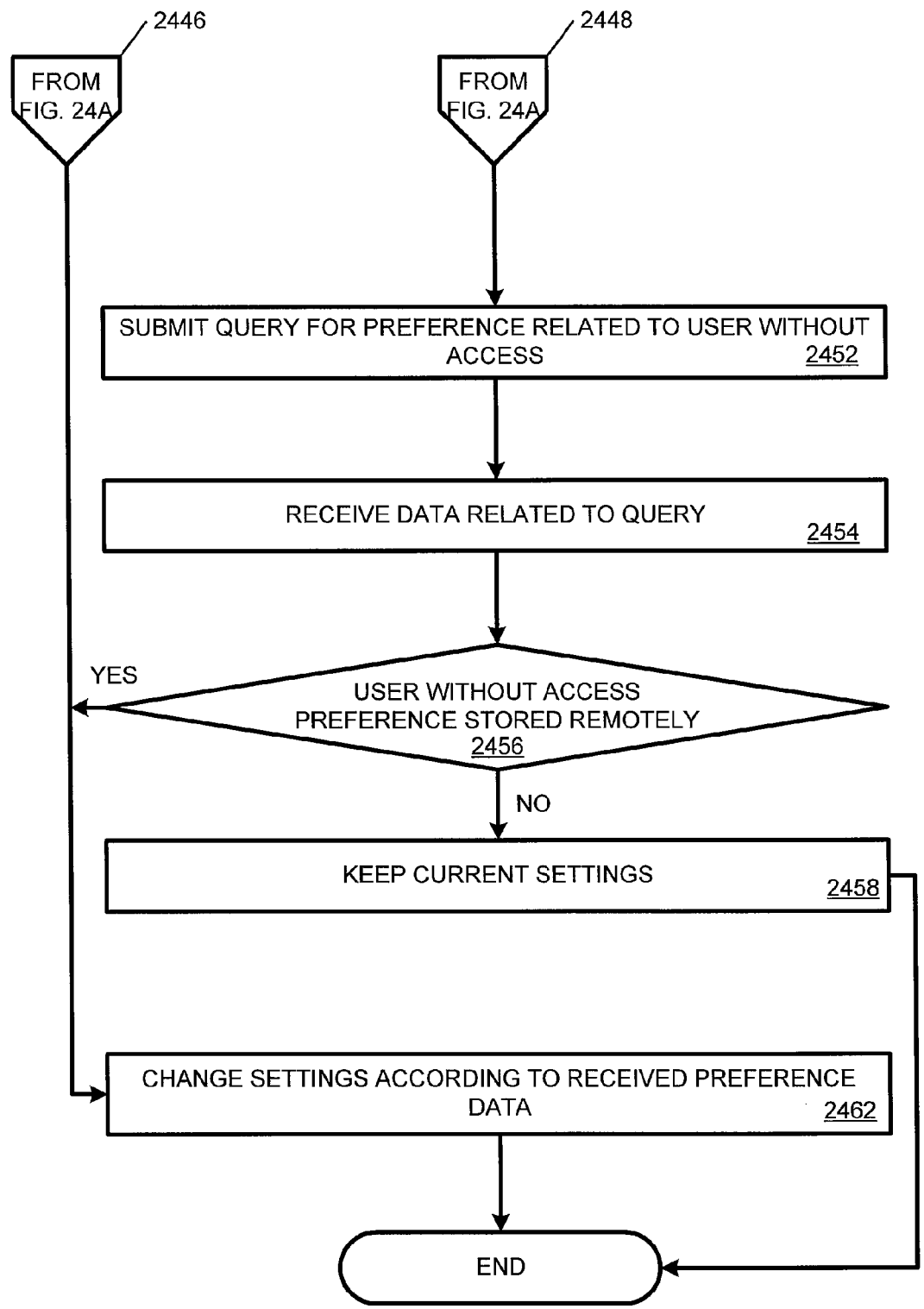
FIG. 24B is a continuation of the flowchart from FIG. 24A.

FIG. 24A is a flowchart illustrating exemplary steps that can be taken by an environment in determining, from a plurality of users, the customized settings to employ, similar to the flowchart from FIG. 20. More specifically, the first step in the nonlimiting example of FIG. 24A is for the environment to receive a signal from a first user (block 2430). Next, the environment can receive a signal from a second user (block 2432). Upon receiving these signals, the environment can determine which of the users have access to the environment (block 2434). If neither user has access to the environment, the environment will keep the current settings (block 2450). If, however, one of the users has access to the environment, the environment can determine whether the user with access has preference data stored locally (block 2436). If the user does have preference data stored locally, the flowchart proceeds to jump block 2446, continued in FIG. 24B. If, however, the user with access does not have preference data stored locally (at the environment), the environment can determine whether the user without access has preference data stored locally (block 2438). If the user without access has preference data stored locally, the flowchart proceeds to jump block 2446, continued in FIG. 24B. If, however, the user without access does not have preference data stored locally, the environment can submit a query for preference data related to the user with access (block 2440). The environment can then receive data related to the query (block 2442). Next, the environment can determine whether the user with access has preference data stored remotely (block 2444). If data related to user preferences are stored remotely, the flowchart proceeds to jump block 2446. If, on the other hand, the user with access does not have preference data stored remotely, the flowchart proceeds to jump block 2448, continued in FIG. 24B.

FIG. 24B is a continuation of the flowchart from FIG. 24A. Referring first to jump block 2448 from FIG. 24A, if the user with access does not have preference data stored remotely (block 2444, FIG. 24A), the environment can submit a query for preference data related to the user without access (block 2452). The environment can then receive data related to the query (block 2454) such as from a remote (and/or local) network. The environment can then determine whether the user without access has preference data stored remotely (block 2456). If the user without access does have preference data stored remotely, the flowchart joins paths with the jump block 2446 to change settings according to the received preference data (block 2462). Jump block 2446 (which is joined in FIG. 24A at blocks 2436, 2438, and 2444) also proceeds to block 2462 to change settings according to the received preference data. If, on the other hand, the user without access does not have preference data stored remotely, the environment can keep the current settings (block 2458).

Figure 25:
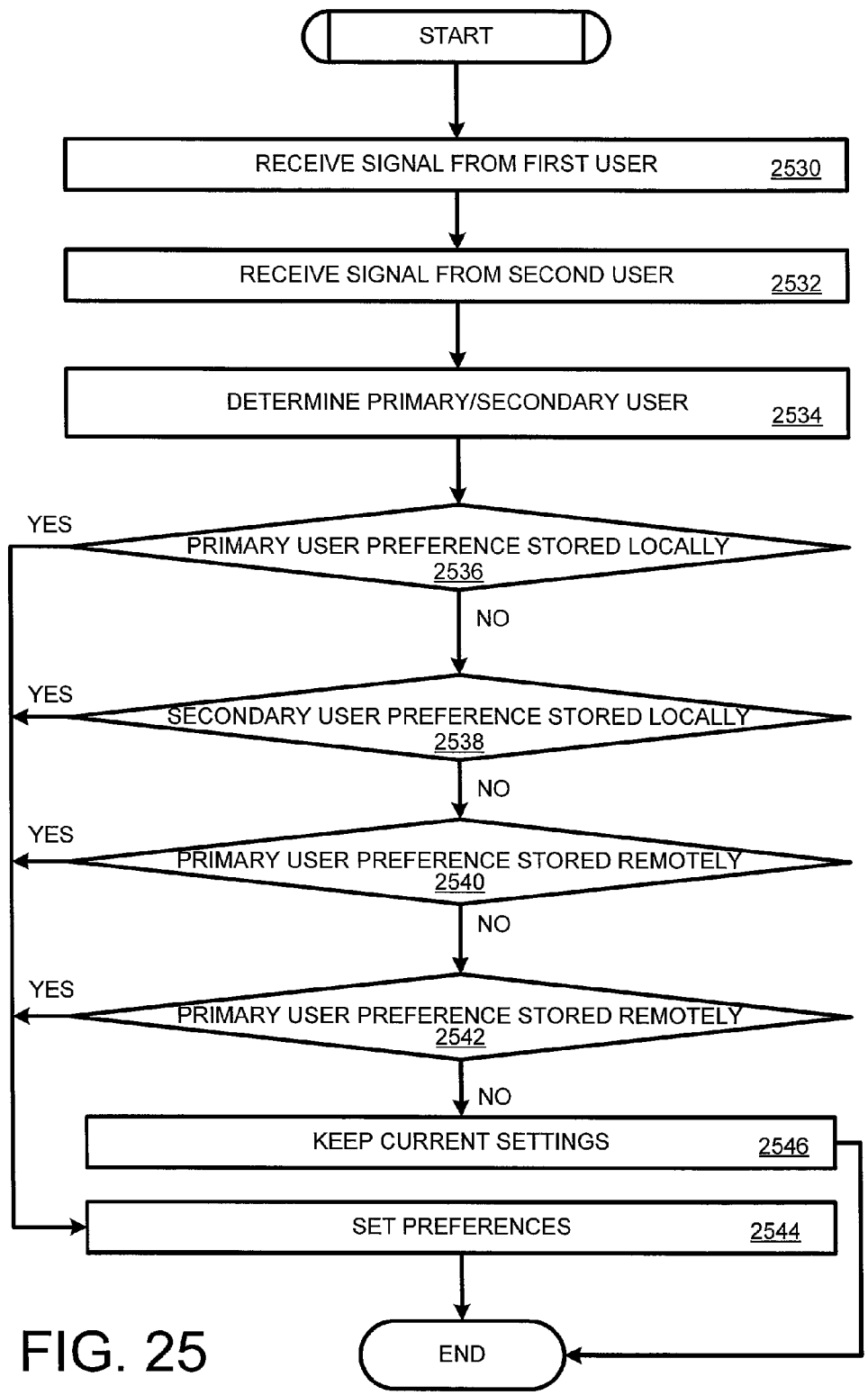
FIG. 25 is a flowchart illustrating exemplary steps that can be taken by an environment in determining a primary user and a secondary user for setting user preferences, similar to the flowchart from FIGS. 24A and 24B.

FIG. 25 is a flowchart illustrating exemplary steps that can be taken by an environment in determining a primary user and a secondary user for setting user preferences, similar to the flowchart from FIGS. 24A and 24B. More specifically, the first step in the nonlimiting example of FIG. 25 is for an environment to receive a signal from a first user (block 2530). The environment can receive a signal from a second user (block 2532), as well. Upon receiving the signals, the environment can determine the primary user and the secondary user (block 2534). As discussed above, the primary user can be determined by a website user setting primary/secondary options with respect to particular environment, however this is not a requirement. More specifically, in at least one embodiment, the primary user for an automobile can automatically be determined by who is driving the car. Similarly for a house, hotel, office, room, or other environment, the primary user can be determined as the user who initially accesses the environment. Other determinations can be made with regard to primary users and secondary users.

Upon determining the primary user(s) and secondary user(s), the environment can determine whether the primary user has preference data stored locally (block 2536). If the primary user does have preference data stored locally, the environment can set preferences in the environment accordingly (block 2544). If, on the other hand, the primary user does not have preference data stored locally, the environment can determine whether the secondary user has preference data stored locally (block 2538). If the secondary user has preference data stored locally, the environment can set preferences in the environment accordingly (block 2544). If, however, the secondary user does not have preference data stored locally, the environment can determine whether the primary user has data stored remotely. If so, the environment can communicate with a remote network 210, as discussed above, to retrieve the preference data. The environment can then set preferences in the environment accordingly (block 2544). If the environment determines that the primary user does not have preference data stored remotely, the environment can determine whether the secondary user has preference data stored remotely (block 2542). If the secondary user has data stored remotely, the environment can retrieve the preference data from a remote network 210 (or local network or both) and set preferences accordingly (block 2544). If, on the other hand, the secondary user does not have data stored remotely, the environment can keep the current settings (block 2546).

Figure 26A:
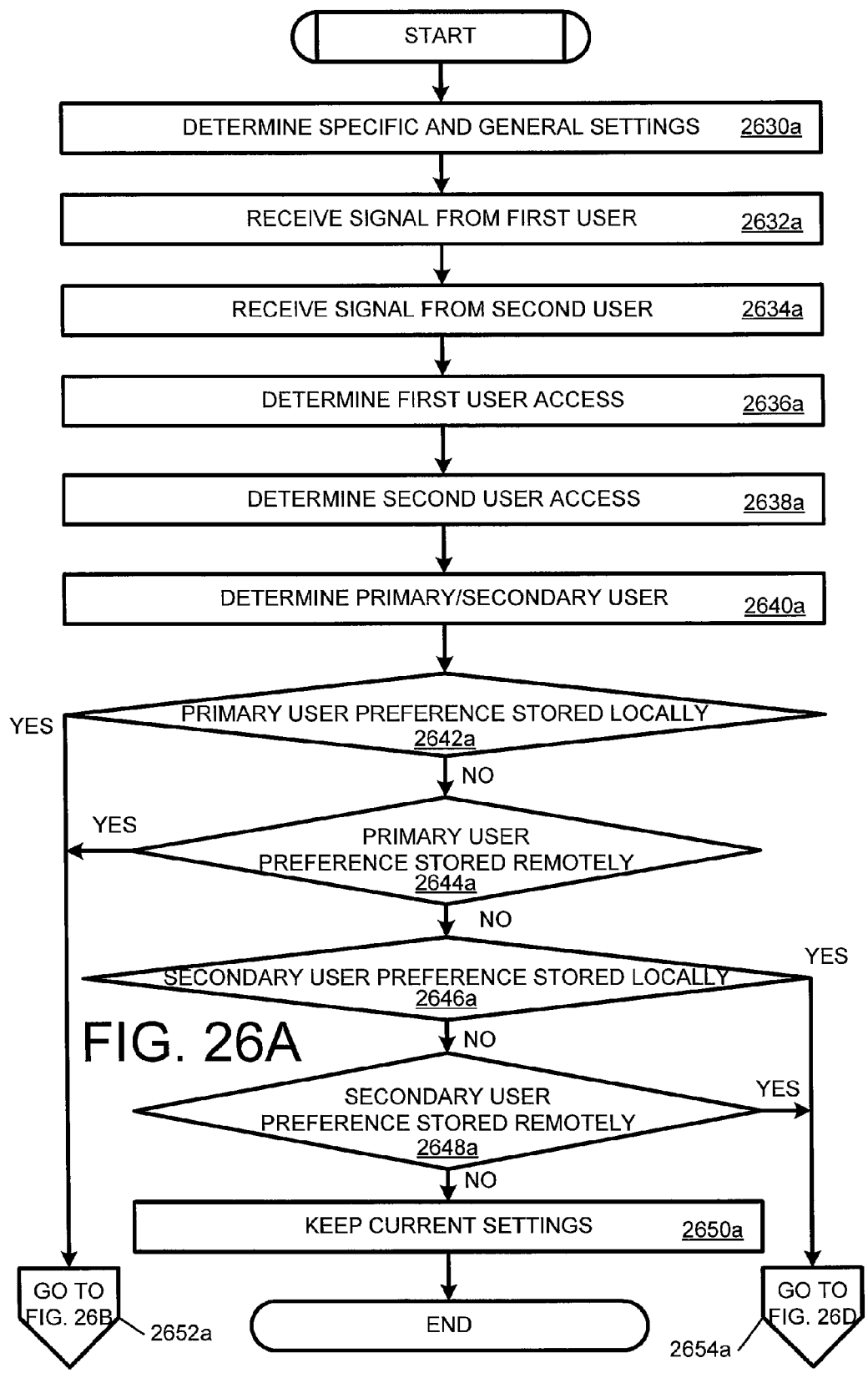
FIG. 26A is a flowchart illustrating exemplary steps that can be taken by an environment in providing user general settings and user specific settings, similar to the flowchart from FIG. 25.

FIG. 26A is a flowchart illustrating exemplary steps that can be taken by an environment in providing user general settings and specific settings, similar to the flowchart from FIG. 25. The first step in the nonlimiting example of FIG. 26A is to determine specific and general settings (block 2630a) for a particular environment. As discussed above, general settings can apply to the environment as a whole (or a portion of the environment), such as, depending on the particular environment, temperature, humidity, etc. Specific settings, on the other hand can be settings that can be personalized for each of the users in an environment (or at least a portion of the users). More specifically, with regard to an automobile environment, specific settings can include seat position, mirror settings, steering wheel position, etc. One should note that while, the step of determining specific settings and general settings is referred to as being performed by the environment, as one of ordinary skill in the art will understand, this step can be performed by the environment, a local network 310, and/or a remote network, etc.

Once the general settings and specific settings are determined, the environment can receive a signal from a first user (block 2632a). The environment can also receive a signal from a second user (block 2634a). Once the signals are received, the environment can determine whether the first user has access (block 2636a) and determine whether the second user has access (block 2638a). Assuming at least one of the first user and second user has access to the environment, the environment can determine the primary user and the secondary user (block 2640). As discussed above, the primary and secondary user can be determined in any of a plurality of ways, including but not limited to a website user configuring environment settings.

Once the primary user and secondary user are determined, the environment can determine whether the primary user has preference data stored locally (block 2642a). If the primary user does have preference data stored locally, the flowchart can proceed to jump block 2652a, continued in FIG. 26B. If the primary user does not have preference data stored locally, the environment determines whether the primary user has preference data stored remotely (block 2644a). If so, the flowchart again proceeds to jump block 2652a, continued in FIG. 26B. If the primary user does not have preference data stored remotely, the environment can determine whether the secondary user has preference data stored locally (block 2646a). If so, the flowchart proceeds to jump block 2654a, continued in FIG. 26D. If the secondary user does not have preference data stored locally, the environment determines whether the secondary user has preference data stored remotely (block 2648a). If so, the flowchart again proceeds to jump block 2654a, continued in FIG. 26D. If the secondary user does not have preference data stored remotely, the environment can be configured to keep the current settings (block 2650a).

Figure 26B:
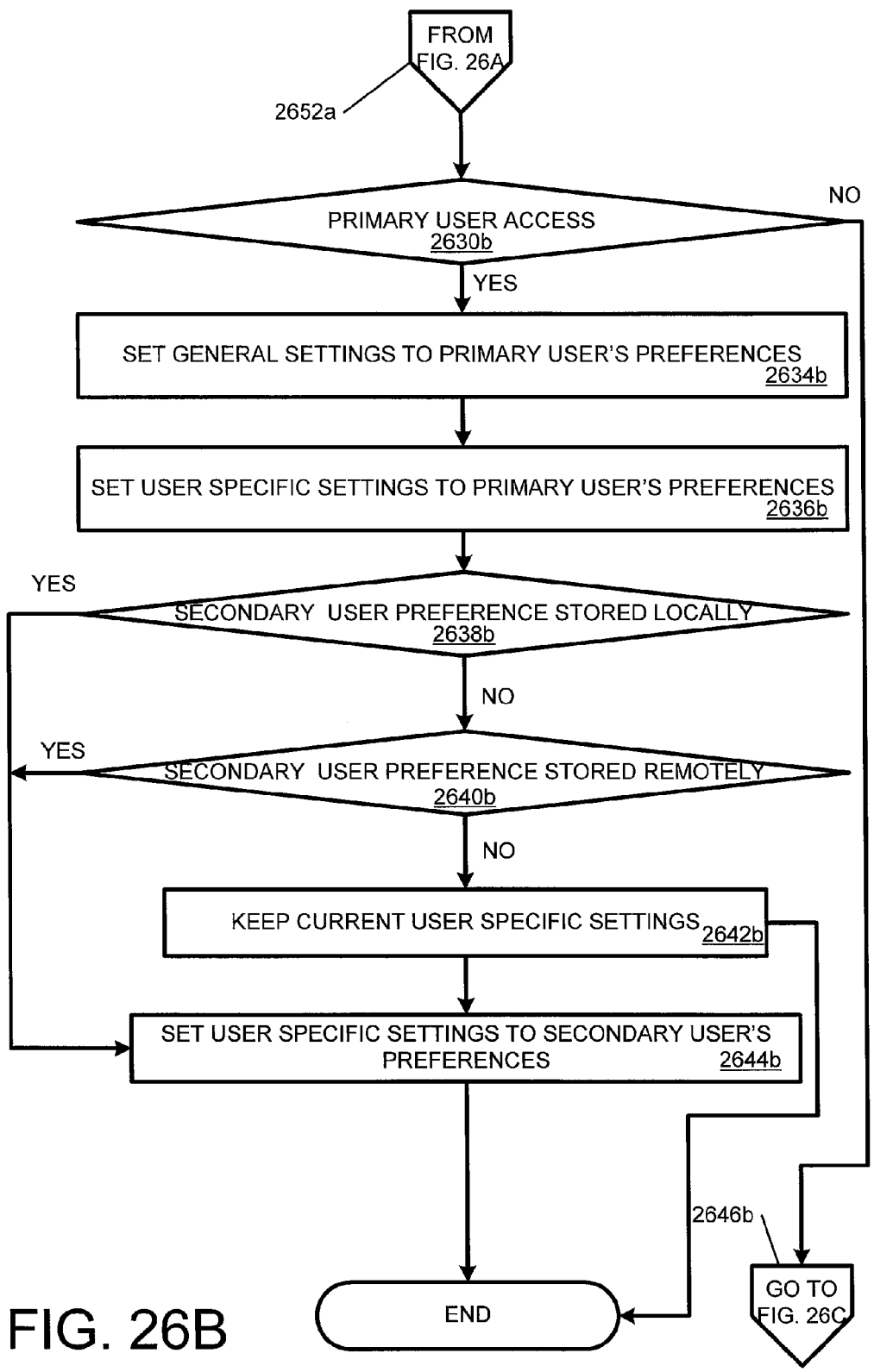
FIG. 26B is a continuation of the flowchart from FIG. 26A.

FIG. 26B is a continuation of the flowchart from FIG. 26A. Proceeding from FIG. 26A, if the primary user is either remotely or locally stored (blocks 2642a, 2644a), the environment can determine whether the primary user has access to the environment (block 2630b). If the user does not have access to the environment, the flowchart proceeds to jump block 2646b, continued in FIG. 26C. If, on the other hand, the primary user has access to the environment, the environment can set the general settings to the primary user's preferences (block 2634b). The environment can then set the user specific settings to the primary user's preferences (block 2636b).

The environment can then determine whether the secondary user has preference data stored either locally (block 2638b) or remotely (block 2640b). If the secondary user has preference data stored either remotely or locally, the environment can set user specific settings to the secondary user's preferences (block 2644b). If the secondary user has preference data neither stored locally nor remotely, the environment can keep the current user specific settings (block 2642b). Alternate embodiments can utilize the primary user's user specific setting settings related to the secondary user.

Figure 26C:
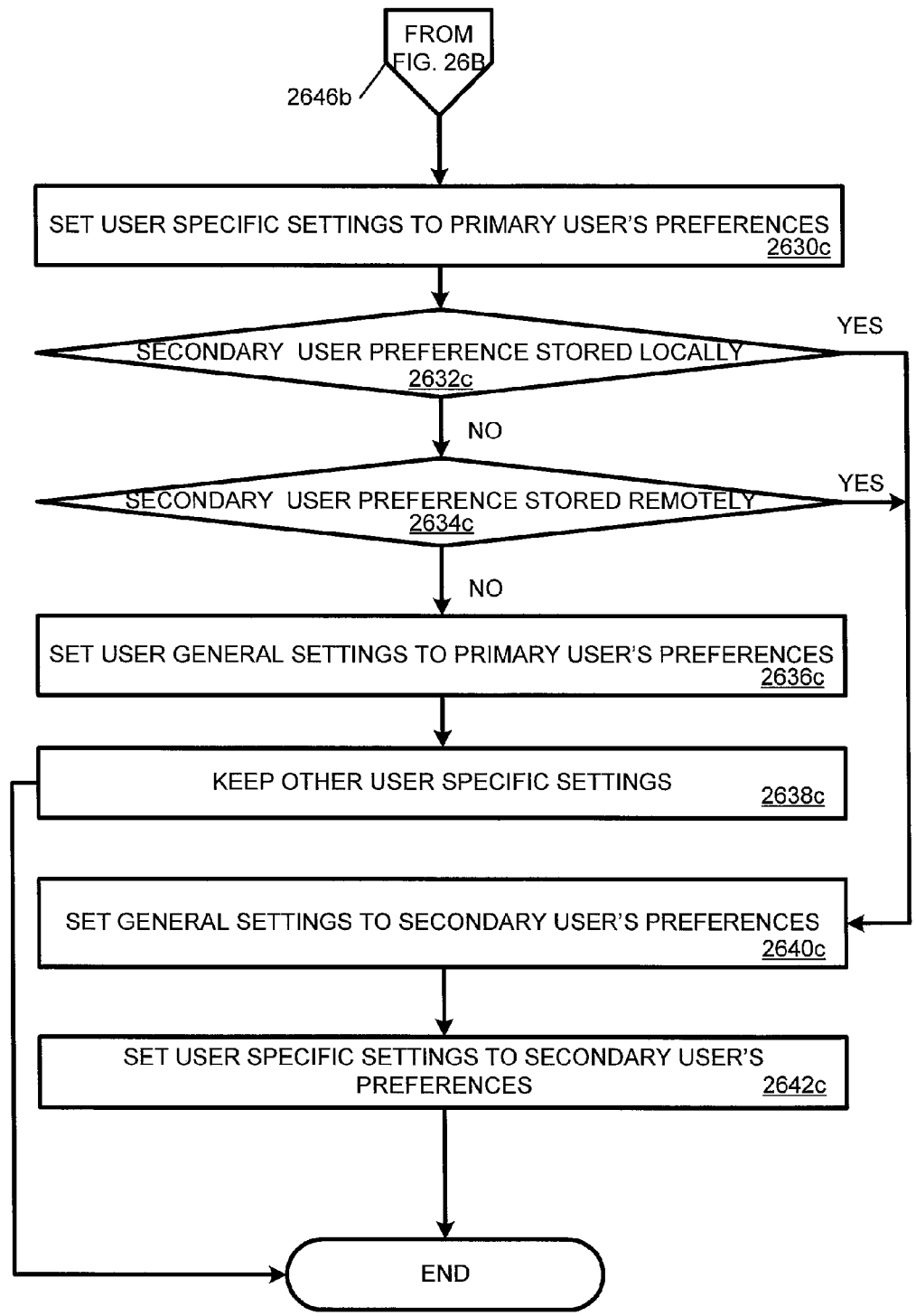
FIG. 26C is a continuation of the flowchart from FIG. 26B.

FIG. 26C is a continuation of the flowchart from FIG. 26B. Referring back to FIG. 26B, if the primary user is stored either locally or remotely, but does not have access to the environment, the environment can set user specific settings to the primary user's preferences (block 2630c). The environment can then determine whether the secondary user has preference data stored either locally (block 2632c) or remotely (block 2634c). If the secondary user does have preference data stored either locally or remotely, the environment can be configured to set the general settings to the secondary user's preferences (block 2640c). The environment can then set user specific settings to the secondary user's preferences (block 2642c).

If, on the other hand, the secondary user has preference data stored neither locally nor remotely, the environment can set the user specific settings to the primary user's preferences, and keep current settings related to other user specific settings (block 2638c). More specifically, if the secondary user does not have preference data stored either remotely or locally, those user specific settings that relate to the second user (such as the secondary user's seat position in an automobile) are kept at their current setting.

Figure 26D:
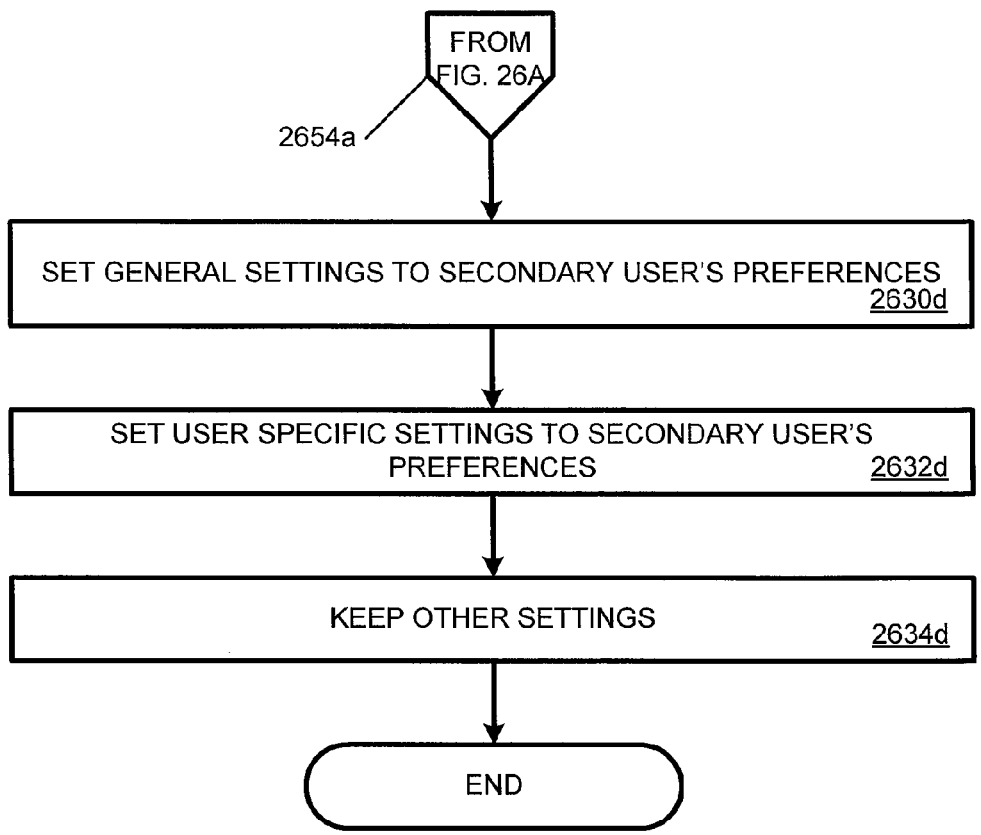
FIG. 26D is another continuation of the flowchart from FIG. 26A.

FIG. 26D is another continuation of the flowchart from FIG. 26A. Referring back to FIG. 26A, if the primary user has preference data neither stored locally nor remotely, but the secondary user does have preference data stored either locally or remotely, the environment can set general settings to the secondary user's preferences (block 2630d). The environment can then set user specific settings to the secondary user's preferences (block 2632d), and keep other settings in their current position (block 2634d).

Figure 27:
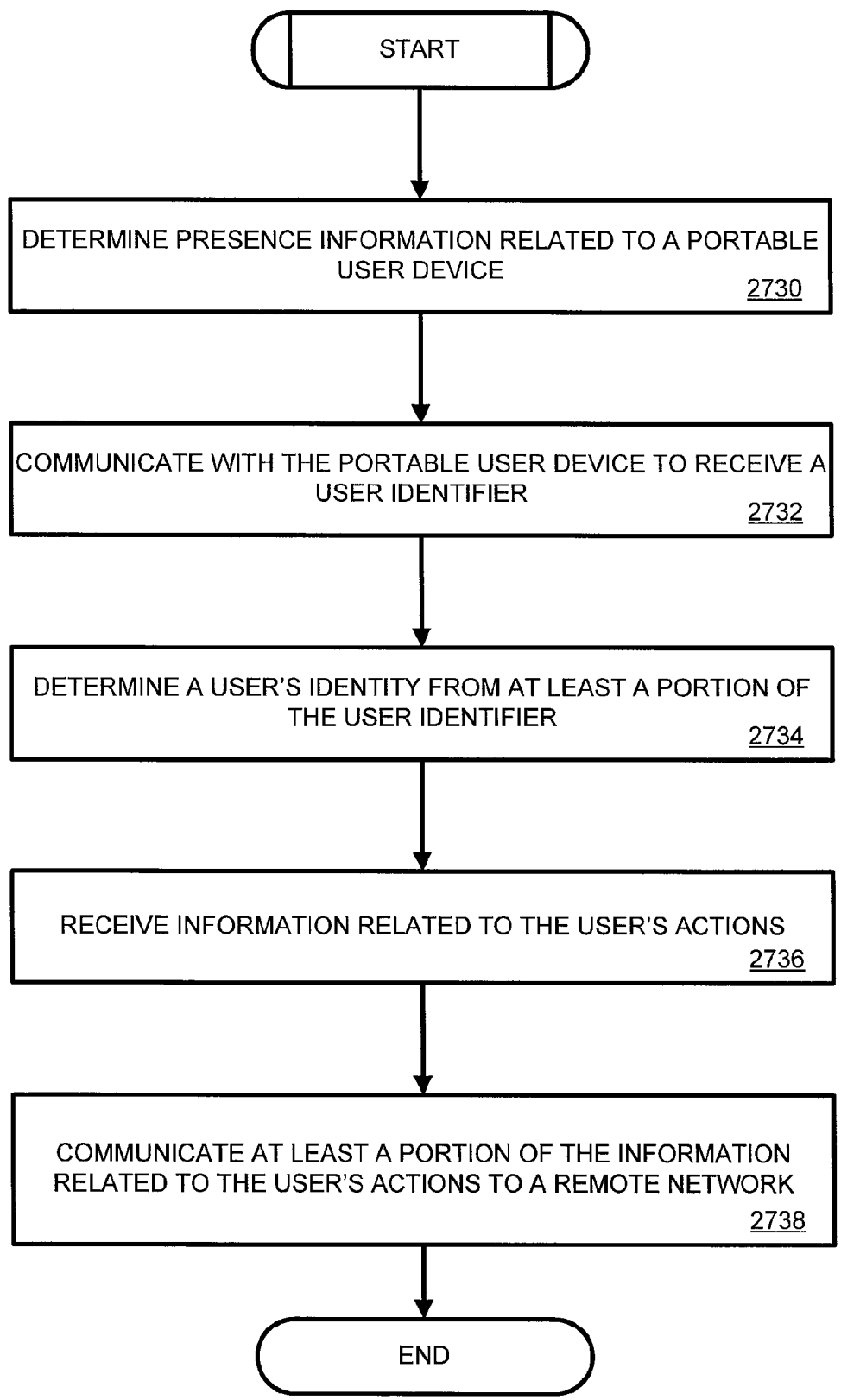
FIG. 27 is a flowchart illustrating exemplary steps that can be taken by an environment for communicating information related to user actions to a remote network, similar to the flowchart from FIGS. 26A-26D.

FIG. 27 is a flowchart illustrating exemplary steps that can be taken by an environment for communicating information related to user actions to a remote network, similar to the flowchart from FIGS. 26A-26D. The first step in the nonlimiting example of FIG. 27 is for an environment to determine presence information related to a portable user device 106 (block 2730). As indicated above, a user can carry a specific user device 106, which can send a signal for an environment. Via this signal the environment can determine presence information related to that user device 106. Once the presence information is received, the environment can communicate with a portable user device 106 to receive a user identifier (block 2732). The environment can then determine a user's identity from at least a portion of the received user identifier (block 2734). The environment can then receive information related to the user's actions (block 2736). More specifically, if a user changes a setting, the environment can receive this change, and then communicate at least a portion or the information related to the user's actions to a remote network 210 (block 2738).

As discussed with reference to FIG. 4, depending on the configuration, any action a user takes in the environment can be sent to the remote network 210, however this is not a requirement. More specifically, in at least one embodiment, the user can make a change and then be promoted to save the change as part of the user's preference data. Other configurations can store the change locally for a predetermined time (or until a predetermined event, such as the user leaving the environment) before sending the user's actions to the remote network 210. In such a configuration, if a user makes many changes (some of which may contradict others), only the final settings are communicated to the remote network 210.

Figure 28:
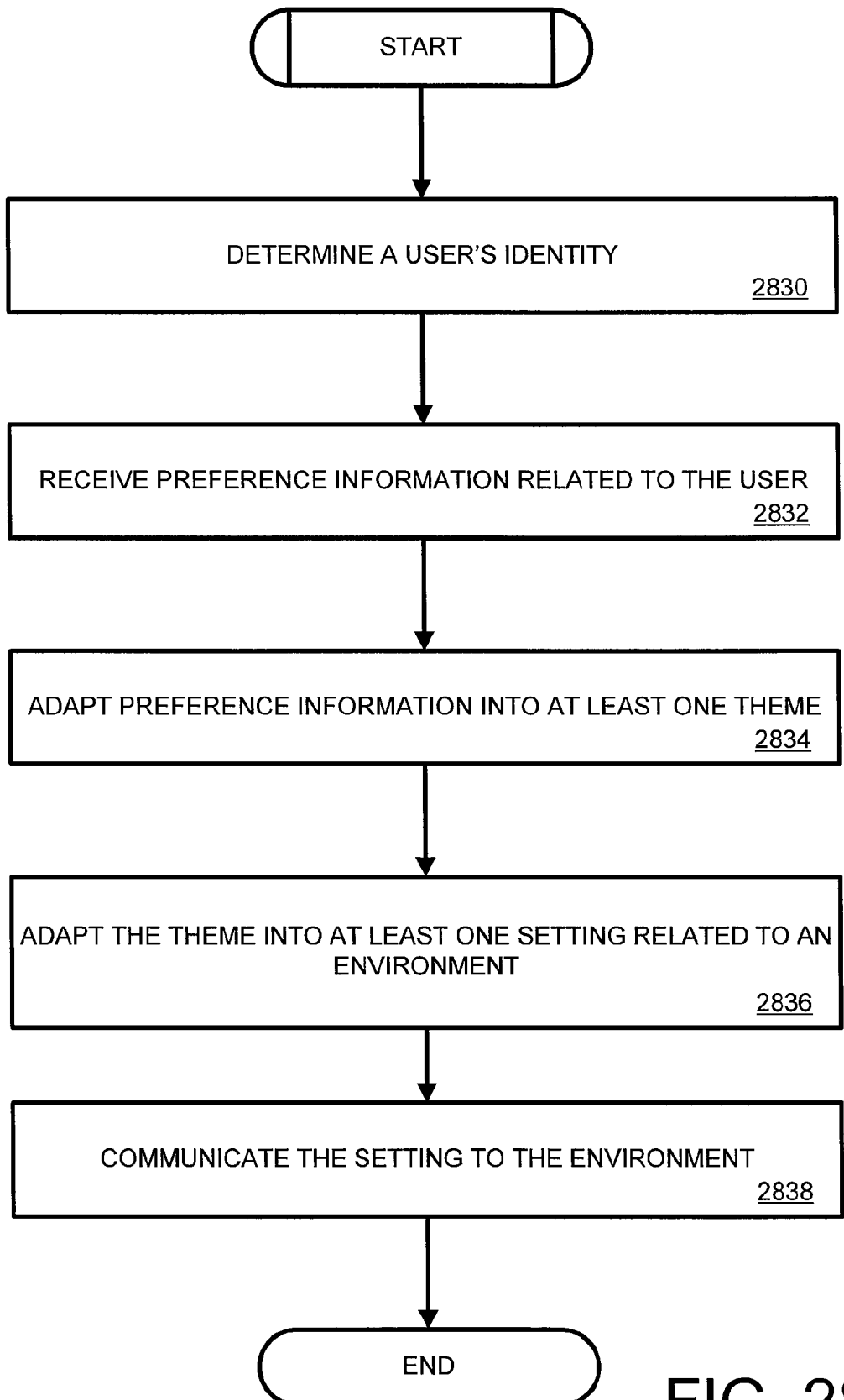
FIG. 28 is a flowchart illustrating exemplary steps that can be taken by a remote network in adapting at least one theme into at least one setting, similar to the flowchart from FIG. 27.

FIG. 28 is a flowchart illustrating exemplary steps that can be taken by a remote network 210 in adapting at least one theme into at least one setting, similar to the flowchart from FIG. 27. The first step in the nonlimiting example of FIG. 28 is for the remote network 210 to determine a user's identity (clock 2830). As discussed above, determining a user's identity can begin when a user sends a user identifier to an environment. The environment can then request the user's identity according to the user identifier. Once the user's identity is determined, the remote network 210 can receive preference information related to the user (block 2832). The preference information can be received from the environment and can simply be simply associated with the settings in that environment. As a nonlimiting example, with respect to an automobile environment, if a user has a specific seat position, a steering wheel position, a car color, a tint level, and a plurality of preset radio stations, this data related to these settings can be sent to the remote network 210.

Upon receiving the preference data, the remote network 210 can adapt at least a portion of the preference information into at least one theme (block 2834). As a nonlimiting example, if the user has classical radio stations programmed, has an upright seat position, and has a beige color to the environment, the remote network 210 can determine that these settings relate to a "conservative" theme. Upon entering another environment, the remote network 210 can adapt that theme (in this nonlimiting example, the "conservative" theme) into at least one setting in that environment (block 2836). The remote network 210 can then communicate that setting to the environment (block 2838).

One should note that while the above description relates to a remote network 210 receiving the preference data from the environment, this is a nonlimiting example. In at least one embodiment the remote network 210 can be received via another source, such as a user account associated with a user preference website (such as in FIGS. 6-18).

Figure 29:
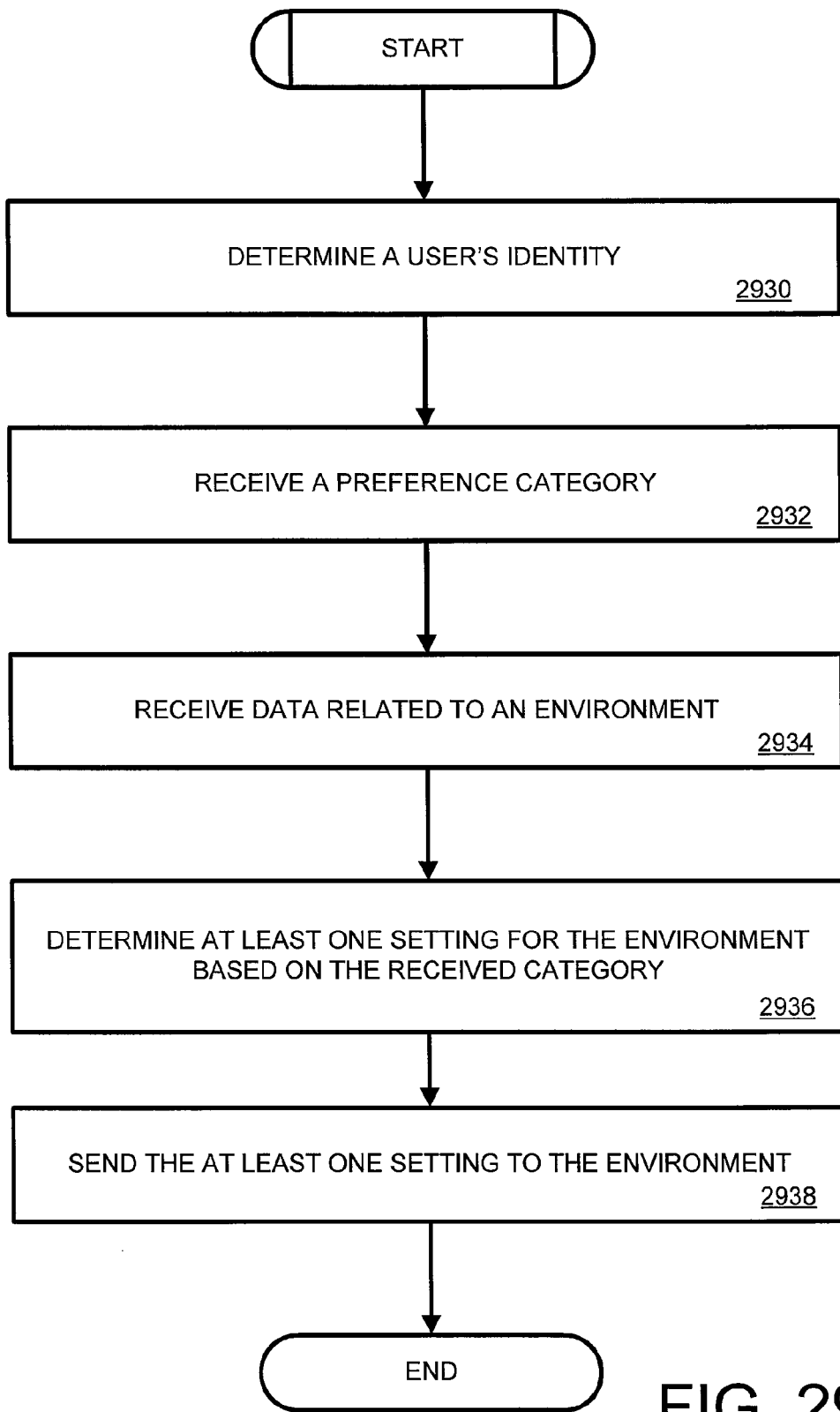
FIG. 29 is a flowchart illustrating exemplary steps that can be taken by a remote network in determining at least one user preference from at least one category, similar to the flowchart from FIG. 28.
Figure 30:
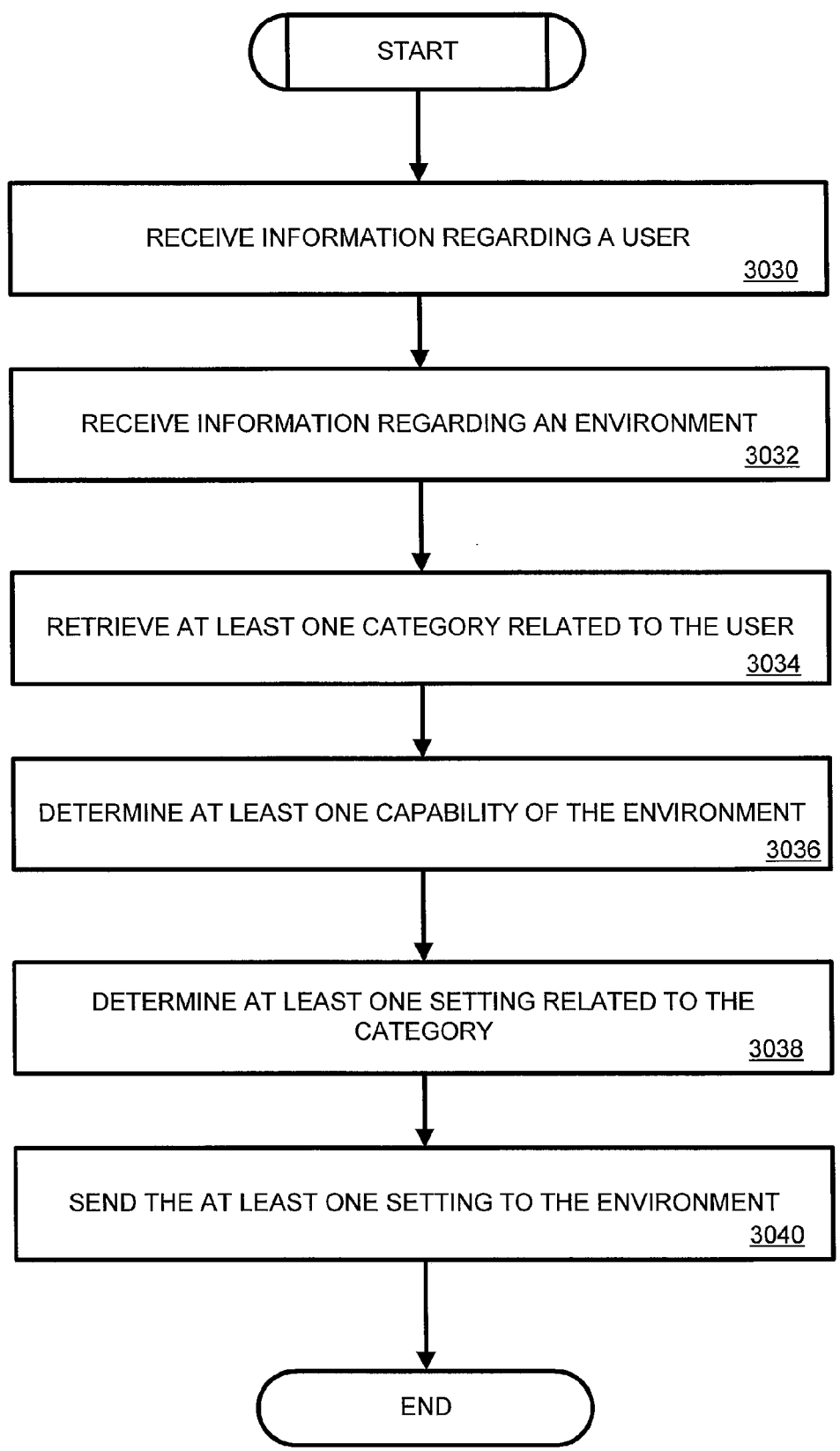
FIG. 30 is a flowchart illustrating exemplary steps that can be taken by a remote network in receiving at least one category that is related to at least one user setting in an environment, such as the environment from FIG. 2.

FIG. 29 is a flowchart illustrating exemplary steps that can be taken by a remote network 210 in determining at least one user preference from at least one category, similar to the flowchart from FIG. 30. More specifically, the first step in the nonlimiting example of FIG. 29 is for the remote network 210 to determine a user's identity (block 2930). Next, the remote network 210 can receive a preference category (block 2932). As described above, the preference category can be received via a website, however this is not a requirement. Upon receiving the preference category, the remote network 210 can receive data related to an environment (block 2934). The remote network 210 can then determine at least one setting for the environment based on the received category (block 2936). The remote network 210 can then send at least one setting to the environment (block 2938).

FIG. 30 is a flowchart illustrating exemplary steps that can be taken by a remote network 210 in receiving at least one category that is related to at least one user setting in an environment, such as the environment from FIG. 2. The first step in the nonlimiting example of FIG. 30 is for the remote network 210 to receive information regarding a user (block 3030). The information can include a user identifier and/or other data. The remote network 210 can then receive information regarding an environment (block 3032). Next, the remote network 210 can retrieve at least one category related to the user (block 3034). The remote network 210 can then determine at least one setting related to that category (block 3038). The remote server can then send the at least one setting to the environment (block 3040).

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for communicating user preferences to an environment, comprising:
receiving, by a network server, a user identifier from a user communication device of a first user within a first specific environment;
determining a first environment preference theme for the user identifier of the first user, the first environment preference theme being environment independent and indicating a general overall preference for environmental settings as specified by the first user;
selecting, by the network server, at least one environment setting for an electronic device within the first specific environment to be adapted to correspond with the first environment preference theme for the first user; and
communicating the environment setting to the electronic device within the first specific environment.

2. The method of claim 1, further comprising receiving a request for the first environment preference theme for the first user, the request being received from a second computing device associated with the first specific environment.

3. The method of claim 1, further comprising:
receiving a request for the first environment preference theme for the first user and a second environment preference theme for a second user; and
determining a primary user from the first user and the second user.

4. The method of claim 1, further comprising providing a graphical user interface that provides an option for the first user to indicate the first environment preference theme.

5. The method of claim 1, wherein determining the first environment preference theme comprises retrieving a category related to the first user.

6. The method of claim 1, where determining the first environment preference theme includes interpreting a user action in a second specific environment and based on the interpretation of the user action, assigning the first particular environment preference theme to the first user.

7. The method of claim 1, the environment including at least one of the following: an automobile, a room, a house, a boat, an airplane, a helicopter, a retail establishment, a gym, and an office.

8. A system for communicating user preferences to an environment, comprising:
a memory component that stores:
first logic to receive a user identifier from a user communication device of a first user within a first specific environment;

second logic to determine a first environment preference theme for the user identifier of the first user, the first environment preference theme being environment independent and indicating a general overall preference for environmental settings as specified by the first user;

third logic to select at least one environment setting for an electronic device within the first specific environment to be adapted to correspond with the first environment preference theme for the first user; and fourth logic to communicate the environment setting to the electronic device within the first specific environment.

9. The system of claim 8, the memory component further storing logic to receive a request for the first environment preference theme for the first user, the request being received from a computing device associated with the first specific environment.

10. The system of claim 8, the memory component further storing:

fifth logic to receive a request for the first environment preference theme for the first user and a second environment preference theme for a second user; and sixth logic to receive a primary user from the first user and the second user.

11. The system of claim 8, the memory component further storing seventh logic to provide a graphical user interface that provides an option for the first user to indicate the first environment preference theme.

12. The system of claim 8, wherein determining the first environment preference theme comprises retrieving a category related to the first user.

13. The system of claim 8, where determining the first environment preference theme includes interpreting a user action in a second specific environment and based on the interpretation of the user action, assigning the first particular environment preference theme to the first user.

14. The system of claim 8, the environment including at least one of the following: an automobile, a room, a house, a boat, an airplane, a helicopter, a retail establishment, a gym, and an office.

15. A non-transitory computer-readable medium for communicating user preferences to an environment that stores a program that, when executed by a computer, causes the computer to perform at least the following:

receive a user identifier from a user communication device of a first user within a first specific environment;

determine a first environment preference theme for the user identifier of the first user, the first environment preference theme being environment independent and indicating a general overall preference for environmental settings as specified by the first user;

select at least one environment setting for an electronic device within the first specific environment to be adapted to correspond with the first environment preference theme for the first user; and communicate the environment setting to the electronic device within the first specific environment.

16. The non-transitory computer-readable medium of claim 15, the program further causing the computer to receive a request for the first environment preference theme for the first user, the request being received from a computing device associated with the first specific environment.

17. The non-transitory computer-readable medium of claim 15, the program further causing the computer to perform at least the following:

receive a request for the first environment preference theme for the first user and a second environment preference theme for a second user; and determine a primary user from the first user and the second user.

18. The non-transitory computer-readable medium of claim 15, the program further causing the computer to provide a graphical user interface that provides an option for the first user to indicate the first environment preference theme.

19. The non-transitory computer-readable medium of claim 15, wherein determining the first environment preference theme comprises retrieving a category related to the first user.

20. The non-transitory computer-readable medium of claim 15, where determining the first environment preference theme includes interpreting a user action in a second specific environment and based on the interpretation of the user action, assigning the first particular environment preference theme to the first user.

* * * * *